United States Patent
Sulaiman et al.

(10) Patent No.: US 12,466,079 B1
(45) Date of Patent: Nov. 11, 2025

(54) SYSTEM AND METHOD FOR OPTIMIZING SLIDE PICK BASKET OPERATIONS

(71) Applicant: Pramana, Inc., Cambridge, MA (US)

(72) Inventors: Mohammad Abdul Sulaiman, Andhra Pradesh (IN); Omkar Appasaheb Kabadagi, Bangalore (IN); Vaishnavi K B, Bengaluru (IN); Rameesh Varshan, Tamil Nadu (IN); Nitesh Kumar, Bengaluru (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/020,332

(22) Filed: Jan. 14, 2025

(51) Int. Cl.
*B25J 9/16* (2006.01)
*B25J 9/00* (2006.01)
*B25J 19/02* (2006.01)
*G06K 7/10* (2006.01)

(52) U.S. Cl.
CPC ........... *B25J 9/1697* (2013.01); *B25J 9/0096* (2013.01); *B25J 9/161* (2013.01); *B25J 19/021* (2013.01); *G06K 7/10861* (2013.01); *G06K 7/1092* (2013.01)

(58) Field of Classification Search
CPC ........ B25J 9/1697; B25J 9/0096; B25J 9/161; B25J 19/021; G06K 7/10861; G06K 7/1092
See application file for complete search history.

(56) References Cited

U.S. PATENT DOCUMENTS

| | | | |
|---|---|---|---|
| 9,001,422 B2* | 4/2015 | Taylor | G02B 21/34 414/744.3 |
| 9,395,285 B2* | 7/2016 | Mohmmadizand | G01N 35/0099 |
| 10,338,365 B2 | 7/2019 | Gholap et al. | |
| 12,214,513 B1* | 2/2025 | Sulaiman | B25J 9/1692 |
| 2004/0062686 A1* | 4/2004 | Ganz | B01J 19/0046 422/504 |
| 2023/0013375 A1* | 1/2023 | Sandkuijl | G02B 21/34 |
| 2024/0426716 A1* | 12/2024 | Shiralkar | G06T 7/12 |

FOREIGN PATENT DOCUMENTS

| | | |
|---|---|---|
| KR | 20180083558 A | 7/2018 |
| KR | 20230165653 A | 9/2024 |

* cited by examiner

*Primary Examiner* — Harry Y Oh
(74) *Attorney, Agent, or Firm* — Caldwell Intellectual Property Law

(57) ABSTRACT

A system for optimizing slide pick basket operations, wherein the system includes at least a robotic arm, at least a processor, and a memory communicatively connected to the at least a processor, wherein the memory contains instructions configuring the at least a processor to perform an orientation check on a plurality of slides in a pick basket, wherein performing an orientation check includes receiving visual data, identifying an orientation of a first slide of the plurality of slides as a function of the visual data, and verifying that the orientation of the first slide aligns with a system requirement, pick the first slide of the plurality of slides as a function of verifying that the orientation of the first slide aligns with the system requirement, and place the first slide at a scanner.

20 Claims, 15 Drawing Sheets

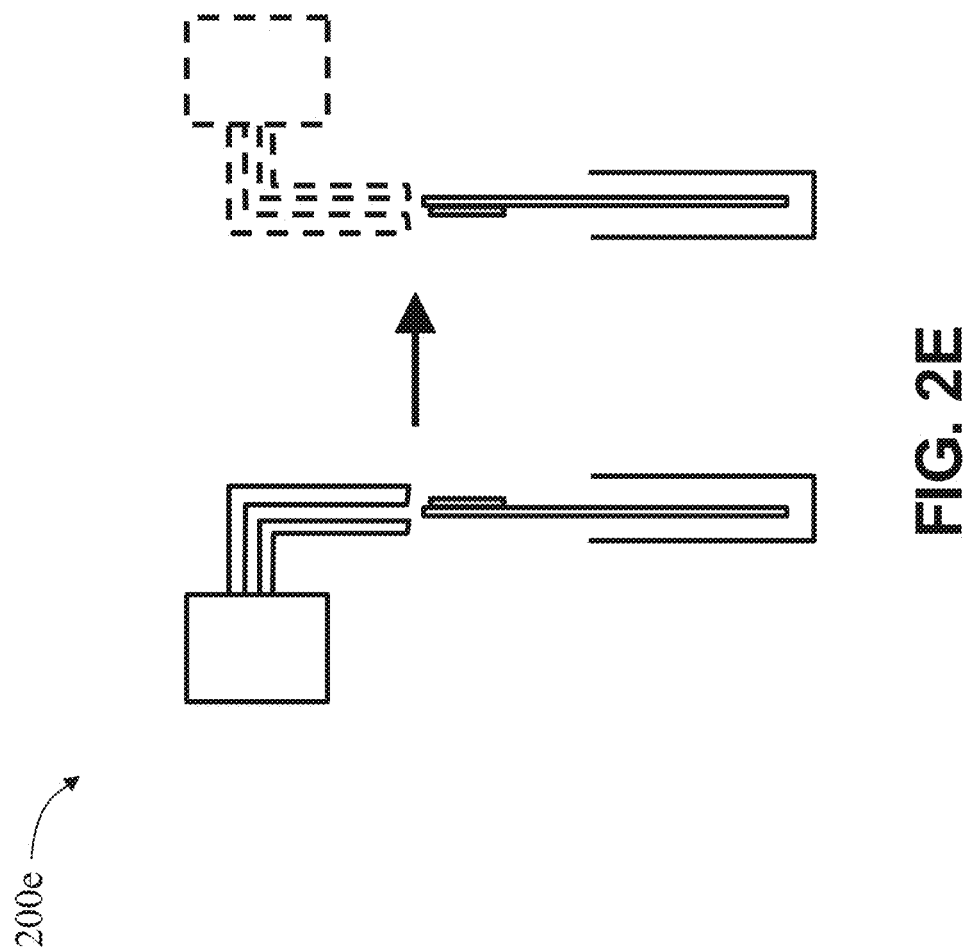

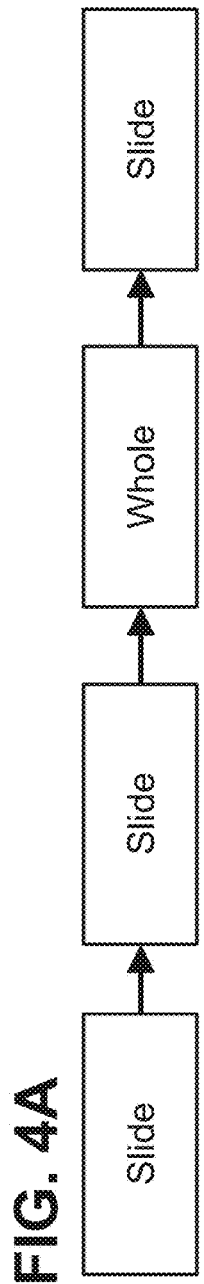
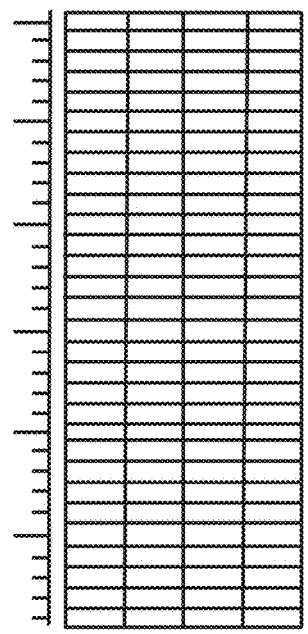
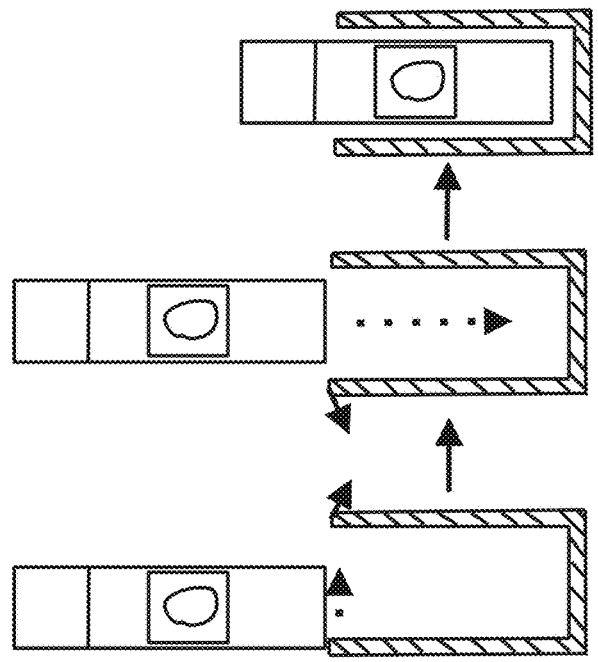
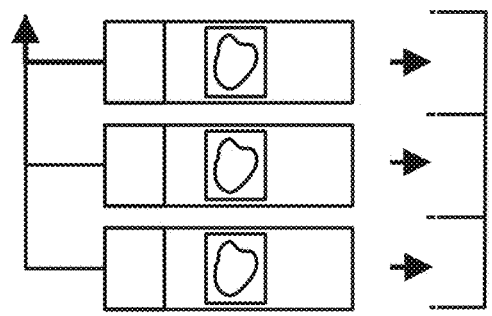
FIG. 4A
FIG. 4B
FIG. 4C
FIG. 4D

SYSTEM AND METHOD FOR OPTIMIZING SLIDE PICK BASKET OPERATIONS

FIELD OF THE INVENTION

The present invention generally relates to the field of slide digitization. In particular, the present invention is directed to systems and methods for optimizing slide pick basket operations.

BACKGROUND

Slide digitization is the process of converting slides containing samples, such as tissue samples, into high-resolution digital formats for easier storage, preservation, and accessibility. This process typically involves scanning or photographing slides using specialized equipment. The resulting digital files can be stored on various digital media, making them easier to manage, share, and preserve for the long term.

SUMMARY OF THE DISCLOSURE

In an aspect, a system for optimizing slide pick basket operations may include at least a robotic arm including one or more actuators operatively connected to a plurality of arm segments, wherein the plurality of actuators is configured to move the plurality of arm segments with respect to one another and a visual data sensor. Further, the system may include at least a processor and a memory communicatively connected to the at least a processor, wherein the memory contains instructions configuring the at least a processor to perform an orientation check on a plurality of slides in a pick basket, wherein performing an orientation check on a plurality of slides in a pick basket includes receiving visual data from the visual data sensor, identifying an orientation of a first slide of the plurality of slides as a function of the visual data, and verifying that the orientation of the first slide aligns with a system requirement, pick, using the at least a robotic arm, the first slide of the plurality of slides as a function of verifying that the orientation of the first slide aligns with the system requirement, and place, using the at least a robotic arm, the first slide at a scanner configured to scan the individual slide.

In another aspect, a method for optimizing slide pick basket operations may include performing an orientation check on a plurality of slides in a pick basket, wherein performing an orientation check on a plurality of slides in a pick basket includes receiving visual data from the visual data sensor, identifying an orientation of a first slide of the plurality of slides as a function of the visual data, and verifying that the orientation of the first slide aligns with a system requirement, picking, using the at least a robotic arm, the first slide of the plurality of slides as a function of verifying that the orientation of the first slide aligns with the system requirement, and placing, using the at least a robotic arm, the first slide at a scanner configured to scan the individual slide.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2A-E illustrate exemplary system diagrams of flipped slide detection using a visual data sensor on the gripper of a robotic arm;

FIGS. 4A-D illustrate exemplary system diagrams of an overview of slide traceability;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for optimizing slide pick basket operations. In an embodiment, systems and methods for optimizing slide pick basket operations enhance scanner efficiency by automating pick basket operations using flipped slide detection.

Aspects of the present disclosure can be used to avoid rescan workflow by performing sanity checks on slide orientation of the slides in a pick basket. Aspects of the present disclosure can also be used to optimize the overall scanning process of slide digitization. This is so, at least in part, because the present systems and methods described automate scanning processes and avoid unnecessary workflow by monitoring scanner statutes and availability.

Aspects of the present disclosure allow for optimized slide pick basket operations. Embodiments of the present disclosure relate to systems and methods for enhancing scanner efficiency by automating pick basket operations using detection of flipped slides and introducing contingency mechanisms to switch pick basket load to another scanned in case of scanner failure. Embodiments of the present disclosure also relate to systems and methods for enabling slide traceability using numbered pick baskets, even in scenarios where slides do not have unique identifiers on the label. Exemplary embodiments illustrating aspects of the present disclosure are described below in the context of several specific examples.

Figure 1:
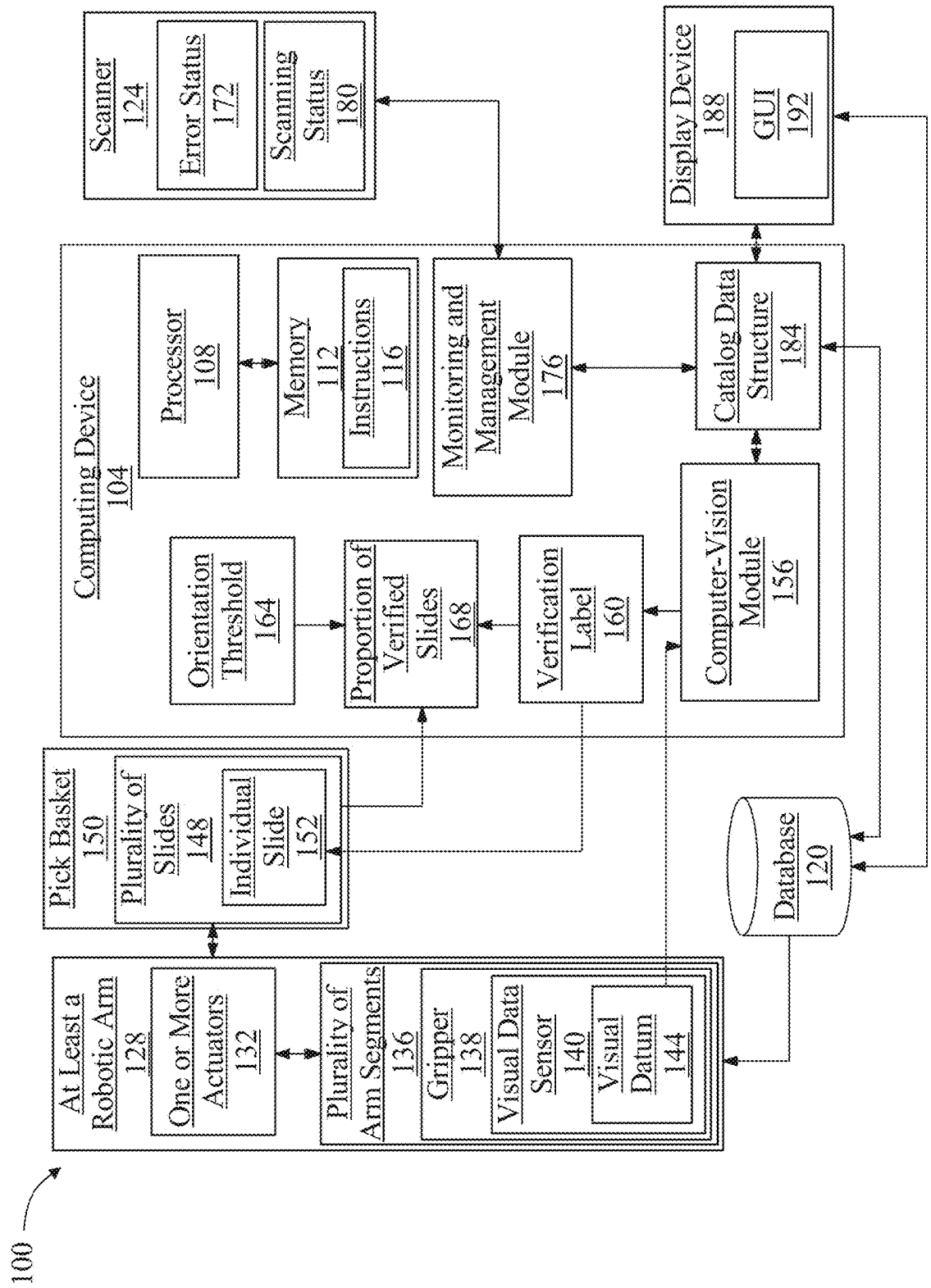
FIG. 1 is block diagram of an exemplary system for optimizing slide pick basket operations.

Referring now to FIG. 1, an exemplary embodiment of a system for optimizing slide pick basket operations is illustrated. In an embodiment, system 100 includes at least a robotic arm 128, at least a processor 108, and a memory 112 communicatively connected to the at least a processor 108.

At least a robotic arm 128 may include one or more actuators 132 operatively connected to a plurality of arm segments 136, wherein the plurality of actuators is configured to move the plurality of arm segments 136 with respect to one another, and a visual data sensor 140. The memory 112 may contain instructions 116 configuring the at least a processor 108 to perform an orientation check on a plurality of slides 148 in a pick basket 150, wherein performing an orientation check on a plurality of slides 148 in a pick basket 150 includes receiving visual data from the visual data sensor 140, identifying an orientation of a first slide of the plurality of slides 148 as a function of the visual data, and verifying that the orientation of the first slide aligns with a system requirement, pick, using the at least a robotic arm 128, an individual slide 152 of the plurality of slides 148 as a function of verifying that the orientation of the first slide aligns with the system requirement, place, using the at least a robotic arm 128, the individual slide 152 at a scanner 124 configured to scan the individual slide 152, and return, using the at least a robotic arm 128, the individual slide 152 to its original position in the pick basket 150.

Still referring to FIG. 1, system 100 includes a computing device 104. Computing device 104 includes a processor 108 communicatively connected to a memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, a communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions 116 and/or information may be transmitted to primary memory wherein information may be processed. In one or more embodiments, information may only be populated within primary memory while a particular software is running. In one or more embodiments, information within primary memory is wiped and/or removed after the computing device 104 has been turned off and/or use of software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 108. In one or more embodiments, data is transferred from secondary to primary memory wherein processor 108 may access the information from primary memory.

Still referring to FIG. 1, system 100 may include a database 120. The database 120 may include a remote database. The database 120 may be implemented, without limitation, as a relational database, a key-value retrieval database such as a NOSQL database, or any other format or structure for use as database that a person skilled in the art would recognize as suitable upon review of the entirety of this disclosure. The database 120 may alternatively or additionally be implemented using a distributed data storage protocol and/or data structure, such as a distributed hash table or the like. The database 120 may include a plurality patient data entries and/or records as described above. Data entries in database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database 120 may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device 104. In one or more embodiments, server may be configured to perform one or more processes as described below to allow for increased computational power and/or decreased power usage by the system 100. In one or more embodiments, computing device 104 may transmit processes to server wherein computing device 104 may conserve power or energy.

Further referring to FIG. 1, Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, a system for digitizing slides may include slide scanning equipment, which may include one or more scanners 124, a cluster table, and one or more pick baskets 150. The one or more scanners 124 may be configured to scan and digitize slides one at a time. In some embodiments, digitization of slides may occur at one or more scanners in parallel. In such an embodiment a pick basket 150 may be located at a cluster table, wherein one or more scanners 124 are located at the cluster table and are referred to as a cluster of scanners 124. In such an embodiment, the workflow may progress in a way in which individual slides 152 from a pick basket 150 are scanned one at a time by each of the scanners 124 in a cluster of scanners 124 until the pick basket 150 is complete. In some embodiments, pick baskets 150 may be numbered. Further, in some cases, pick baskets 150 may be equipped with slots designed to accommodate slides for each scanner 124 in the cluster of scanners 124. Each slot may be given a unique identification based on its location in the pick basket 150. The number of pick baskets 150 available to a cluster of scanners 124 may depend on the number of scanners 124 available and/or the number of pick baskets 150 necessary for a given workflow load.

Continuing to reference FIG. 1, once a pick basket 150 is loaded, it is placed in a designated location on the cluster table. Prior to scanning, the slides are checked to verify if the slide orientation is correct or if it is flipped. When a slide is placed in flipped orientation in the pick basket 150, it leads to out-of-focus whole slide images during scanning. This triggers the scanner 124 to reject the flipped slide hence wasting scanning time. Also, the rescan workflow is triggered requiring more effort and time to digitize the glass slide and can be avoided if flip is detected prior to scanning.

With continued reference to FIG. 1, when any scanner 124 goes down or is in an error state, it disrupts the operation of the cluster. System 100 enables an automated contingency mechanism to handle the slides in the partially complete pick basket 150 corresponding to the scanner 124 under error, thereby minimizing the downtime and causing less disruption to the operation of the cluster.

Further referencing FIG. 1, in scenarios where slides do not have unique identifiers on the label, the traceability of the slides can be enabled by using the slot ID of the pick basket 150. The cluster module tracks the position of each slide in the pick basket 150 and maintains a look-up table between the slot ID and the whole slide image of the corresponding slide.

In further reference to FIG. 1, in an embodiment, system 100 may include at least a robotic arm 128 including one or more actuators 132 operatively connected to a plurality of arm segments 136, wherein the one or more actuators 132 is configured to move the plurality of arm segments 136 with respect to one another, and a visual data sensor 140. As used throughout this disclosure, a "robotic arm" is a mechanical device designed to mimic the movements and functionality of a human arm. A robotic arm 128 may include interconnected joints, segments, and actuators that allow it to move in a variety of directions and perform tasks such as lifting, manipulating, and/or assembling objects. An "actuator" is a device responsible for moving or controlling a mechanism or system, often converting energy into motion. For example, one or more actuators 132 may include electric motors (servo motors, DC motors, etc.), pneumatic actuators, hydraulic actuators, linear actuators, and/or the like. In an embodiment, one or more actuators 132 may include one or more of those as listed.

With continued reference to FIG. 1, one or more actuators 132 may include a component of a machine that is responsible for moving and/or controlling a mechanism or system. One or more actuators 132 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, one or more actuators 132 may respond by converting source power into mechanical motion. In some cases, one or more actuators 132 may be understood as a form of automation or automatic control.

With continued reference to FIG. 1, in some embodiments, one or more actuators 132 may include a hydraulic actuator. A hydraulic actuator may consist of a cylinder or fluid motor that uses hydraulic power to facilitate mechanical operation. Output of a hydraulic actuator may include mechanical motion, such as without limitation linear, rotatory, or oscillatory motion. In some cases, a hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, one or more actuators 132 may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, one or more actuators 132 may include an electric actuator. Electric actuators may include any of electromechanical actuators, linear motors, and/or the like. In some cases, one or more actuators 132 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limiting electric motor parameters may include rotational position, input torque, velocity, current, and potential. Electric actuators may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters may include, without limitation, position, force, velocity, potential, and/or current.

With continued reference to FIG. 1, in some embodiments, one or more actuators 132 may include a mechanical actuator. In some cases, a mechanical actuator may function to execute movement by converting one kind of motion, such as rotary motion, into another kind, such as linear motion. An exemplary mechanical actuator may include a rack and pinion. In some cases, a mechanical power source, such as a power take off may serve as power source for a mechanical actuator. Mechanical actuators may employ any number of mechanisms, including for example, without limitation, gears, rails, pulleys, cables, linkages, and/or the like.

Still referring to FIG. 1, as used throughout this disclosure, "operatively connected" refers to a physical or functional link between two components in such a way that a first component can control or influence the movement of a second component. For example, the one or more actuators 132 may be physically and/or functionally linked to the arm segments in such a way that they can control or influence the movement of those segments. A physical link or connection may include a mechanical attachment such as through joints, gears, and/or other connecting structures. Likewise, a functional link or connection may include a link between the one or more actuators 132 and the control system of at least a robotic arm 128, allowing the one or more actuators 132 to respond to commands and produce precise motions in the arm segments. "Arm segments," as used herein, refers to the individual parts or sections of a robotic arm. The plurality of arm segments 136 may be connected in a sequential or articulated manner, with each segment being linked to the next via joints and/or other mechanisms, allowing for coordinated movement. In an embodiment, the at least a robotic arm 128 may include a base segment, a shoulder segment, an upper arm segment, a forearm segment, an end effector or gripper 138 segment, and/or the like. Each arm segment in the at least a robotic arm 128 may move independently, however their movements are often coordinated and controlled by one or more actuators 132 and/or joints to perform tasks such as grasping, lifting, and/or assembling.

Continuing to reference FIG. 1, in some embodiments, the at least a robotic arm 128 may include a gripper 138, which may include a visual data sensor 140. A "gripper" is a device attached to the robotic arm to perform tasks such as gripping, holding, or manipulating objects. In an embodiment, gripper 138 may include two-finger gripper, three-finger gripper, vacuum gripper, magnetic gripper, soft gripper, and/or the like. Gripper 138 may align with embodiments, without limitation, as disclosed in U.S. patent application Ser. No. 18/382,386, filed on Oct. 20, 2023 and entitled "APPARATUS AND METHOD OF USE OF A MECHANISM THAT CONVERTS ROTARY MOTION INTO LINEAR MOTION" the entirety of which is incorporated herein by reference. As used throughout this disclosure, a "visual data sensor" is a device that captures or senses visual information. Visual data sensor 140 may use cameras and/or optical sensors to collect visual data, which may include color, light intensity, depth, and/or other visual characteristics. Visual data sensor 140 may enable system 100 to "see" its surroundings and make decisions based on visual input. Visual data may be used for tasks such as object recognition, motion tracking, environment mapping, and/or quality inspection. In an embodiment, visual data sensor 140 may include cameras, light detection and ranging (LIDAR), RGB (red, green, blue) sensors, depth cameras, optical sensors, computer-vision enabled sensors, and/or the like. In an embodiment, visual data sensor 140 may include an optical scanner. For example, visual data sensor may include an optical scanner in instances wherein individual slide 152 includes a barcode. In some embodiments, visual data sensor 140 may include one or more sensors as described above. For example, and without limitation visual data sensor 140 may include a camera and an optical sensor.

Further referencing FIG. 1, as used throughout this disclosure, a "slide" is a thin, flat piece of glass or plastic used in laboratories, typically for preparing and viewing biological samples under a microscope. Slides are often used in histology, pathology, and cytology to examine tissue, cells, and/or fluids for diagnostic, research, and/or educational purposes. A plurality of slides 148 may be prepared by placing a sample on the surface of the slide and then staining or fixing the sample to preserve it and make the microscope structures more visible. In some embodiments, a cover slip or an additional glass slide may be placed on top of the sample to protect and keep it in place. A plurality of slides 148 may include any type of medical slide. For example, slides may include histological slides, cytology slides, blood smears, microbial slides, and/or the like. Each individual slide 152 of a plurality of slides 148 may include one or more identifiers. Identifiers may ensure proper tracking, labeling, and linking to patient or sample information. For example, one or more identifiers may include patient ID, sample ID or slide ID, test procedure type, sample, source, batch or accession number, date of collection, physician/technician ID, diagnostic or disease code, staining or preparation method, location in the laboratory or storage, barcode or QR code, slide type, pathologist's comments, digitized image link, quality control or review status, and/or the like. In some embodiments, plurality of slides 148 may not have one or more identifiers. In such an embodiment, identification may be dependent on their placement within a pick basket 150 and placement of the pick basket 150 within a cluster.

In continued reference to FIG. 1, in an embodiment, visual data sensor 140 may include an optical sensor configured to detect at least a visual datum 144. In such an embodiment, the at least a processor 108 may be configured to receive the at least a visual datum 144 and determine the orientation of an individual slide 152 of the plurality of slides 148 as a function of the at least a visual datum 144. An "optical sensor" is a device that detects light and converts it into an electrical signal that can be processed by a system. Optical sensors may be used to measure various properties of light, such as intensity, color, and/or wavelength, and can be employed in applications involving imaging, distance measurements, and/or environmental sensing. Optical sensors may include photodiodes, phototransistors, photocells, optical cameras, laser sensors, and/or the like. As used throughout this disclosure, a "visual datum" is an individual unit of visual data that is captured by a sensor. For example, a visual datum 144 may represent various aspects such as colors, shapes, objects, and/or patterns within a visual field. The at least a processor 108 may determine the orientation of the individual slide 152 as a function of the at least a visual datum 144, which is discussed in further detail below.

In further reference to FIG. 1, in an embodiment, visual data sensor 140 may include a computer-vision enabled sensor configured to detect at least a visual datum 144. In such an embodiment, the at least a processor 108 may be configured to receive the at least a visual datum 144 and determine the orientation of an individual slide 152 of the plurality of slides 148 as a function of the at least a visual datum 144. A "computer-vision enabled sensor" refers to a type of sensor system that combines traditional sensing capabilities with computer vision algorithms. Computer-vision enabled sensors can capture data from the environment and then use image processing techniques to extract meaningful insights, such as recognizing objects, detecting movement, identifying patterns, and/or tracking changes. Computer-vision enabled sensors may include one or more optical sensors as previously discussed. In some embodiments, computer-vision enabled sensors may include imaging hardware, such as a cameras or other optical sensors that capture raw visual data, computer vision algorithms, a processing unit, such as at least a processor 108, and output that correlates to an action or trigger event. For example, the at least a processor 108 may be configured to receive the at least a visual datum 144 and determine the orientation of an individual slide 152 of the plurality of slides 148 as a function of the at least a visual datum 144, which is discussed in further detail below.

Still referring to FIG. 1, in some embodiments, visual data sensor 140 may include a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

Still referring to FIG. 1, in some embodiments, visual data sensor 140 may include a machine vision system that includes at least a camera. A machine vision system may use images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

An exemplary machine vision camera that may be included in an environmental sensor is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640× 480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

In further reference to FIG. 1, in an embodiment, an individual slide 152 of the plurality of slides 148 may include a barcode. In such an embodiment, the visual data sensor 140 may be configured to scan the barcode for at least a visual datum 144. At least a processor 108 may be configured to receive at least a visual datum 144 and determine the orientation of the individual slide 152 as a function of the at least a visual datum 144. A "barcode" is a visual representation of data that can be scanned and interpreted by machines. A barcode may include a series of parallel lines, spaces, and sometimes characters that encode information about an item, such as identity or other relevant data. In some embodiments, the barcode may include a one-dimensional barcode and/or a two-dimensional barcode. The one-dimensional barcode is the traditional barcode that includes a series of vertical lines and spaces of varying widths. The information is encoded in the sequence of bars and spaces. For example, the one-dimensional barcode may include the Universal Product Code (UPC) and/or the International Article Number (EAN), which are widely used in retail for product identification. Alternatively, two-dimensional barcodes store data both horizontally and vertically, allowing for more information to be encoded in a smaller space. For example, a two-dimensional barcode may include a Quick Response (QR) code, which can store much more information, such as URLs, contact details, or other data. In some embodiments, the barcode may include data such as patient ID, Sample ID, test type, slide number, data/time, physician/technician ID, sample source, tissue or organ type, test results, barcode serial number, and/or the like. At least a processor 108 may be configured to determine the orientation of the individual slide 152 as a function of the at least a visual datum 144 as described in further detail below.

Continuing to reference FIG. 1, in an embodiment at least a processor 108 is configured to perform an orientation check on a plurality of slides 148 in a pick basket 150. As used throughout the disclosure, a "pick basket" is a mechanism used to hold or organize multiple slides. A pick basket 150 may help in sorting slides based on specific criteria, such as sample type, patient ID, batch, and/or testing priorities. In an embodiment, the pick basket 150 may include a plurality of slots having a designated slot ID, wherein each slot holds an individual slide 152. Performing an orientation check on a plurality of slides 148 in a pick basket 150 may include receiving visual data from the visual data sensor 140, identifying an orientation of a first slide of the plurality of slides 148 as a function of the visual data, and verifying that the orientation of the first slide aligns with a system requirement. A first slide refers to an individual slide 152 of the plurality of slides 148 in the first position of the pick basket 150. In an embodiment, a first slide may be used as a sample orientation of the entire pick basket 150. Alternatively, system 100 may identify the orientation of a given proportion of a plurality of slides 148 in order to determine the orientation of the entire pick basket 150. As used herein, an "orientation check" refers to the process of determining if a slide is in a correct position or in a flipped position. Visual data may include at least a visual datum 144 as described previously in relation to different embodiments of visual data sensor 140. Visual data may include an aggregation of multiple at least a visual datum 144. A "system requirement," as used herein, refers to a system reference for the correct slide orientation. For example, and without limitation, a system requirement may include a specific direction of an identifier and/or the sample present on an individual slide 152. For example, a system requirement may include a requirement that the barcode and/or sample present on an individual slide 152 is facing up or in a specific direction. If the label, barcode, and/or sample, are upside down, or facing the wrong direction it may indicate that the slide is flipped and/or misaligned.

In continued reference to FIG. 1, identifying an orientation of a first slide of the plurality of slides 148 as a function of visual data received from visual data sensor 140. In an embodiment, identifying an orientation may include scanning for a specific visual datum 144, such as a barcode, label, and/or the like. If visual data sensor 140 senses or detects the specific visual datum 144 required by a system requirement, at least a processor 108 may determine that the individual slide 152 is in the correct orientation. Alternatively, if visual data sensor 140 does not sense or detect the specific visual datum 144 required by a system requirement then at least a processor 108, may determine that the individual slide 152 is in a flipped position. Once the orientation is identified, the at least a processor 108 may compare the orientation to a system requirement. If the identified orientation and the system requirement match the slide is determined to be in the correct orientation. Alternatively, if the orientation and the system requirement are mismatched, the slide is determined to be flipped.

Still referring to FIG. 1, in an embodiment system 100 may use computer-vision module 156 to identify an orientation of a first slide, wherein the visual data sensor 140 includes one or more computer-vision enabled sensors and the at least a processor 108 processes the visual data generated from the computer-vision enabled sensors. This embodiment may be useful in situations wherein a plurality of slides 148 does not have an identifier outside of their placement within the pick basket 150 and their correlation to their location in a cluster. In order to identify an orientation of a first slide, computer-vision module 156 may detect or utilize text or labels, employ image recognition of objects, such as biological samples, use edge detection and geometric analysis, marker detection, rotation algorithms, and/or use comparisons to reference data such as historical slide data and orientations. In an embodiment, wherein computer-vision module 156 uses text and/or labels to identify the orientation of a first slide, if the slide contains any readable text and it appears inverted or mirrored the slide may be flipped. In such an embodiment, computer-vision module 156 may utilize optical character recognition (OCR), which may be used to analyze the text located on an individual slide 152. The process of image recognition of objects, such as biological samples, may implement one or more computer-vision algorithms to analyze the orientation of recognizable objects at the at least a processor 108. In some embodiments system 100 may utilize edge detection and geometric analysis, which may include shape recognition. Wherein shape recognition may occur at the at least a processor 108, wherein the at least a processor 108 may detect edges and analyze the orientation based on expected geometric alignment. Shape recognition may employ computer-vision algorithms similar to image recognition of objects. In some embodiments, computer-vision module 156 may employ marker detection, wherein the visual data includes a symbol, a logo, or markers that appear in a certain orientation. If the slide is flipped, these markers may appear reversed and/or inverted.

Computer-vision algorithms may be implemented in a computer-vision module 156, wherein the module includes a machine-learning model trained on historical slide data classified as a correct orientation or a flipped orientation. "Historical slide data," as used herein, refers to a collection of data, records, and metadata associated with medical slides that have been created, analyzed, or stored in the past. Computer-vision module 156 may additionally include one or more rotation algorithms, wherein the rotation algorithm calculates the angle of rotation form a reference orientation. If the angle is 108 degrees, this would indicate that the slide is flipped upside down. In one or more embodiments, at least a processor 108 may further utilize one or more feature learning algorithms in order to identify an orientation of a first slide. The one or more computer-vision algorithms, rotation algorithms, and/or feature learning algorithms may be nested in the computer-vision module 156, enabling system 100 to identify the orientation of an individual slide 152.

With continued reference to FIG. 1, a "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 120, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

In further reference to FIG. 1, a "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of elements of data, as defined above, with each other. As a non-limiting example, feature learning algorithm may detect co-occurrences of elements, as defined above, with each other. Computing device 104 may perform a feature learning algorithm by dividing elements or sets of data into various sub-combinations of such data to create new elements of data, and evaluate which elements of data tend to co-occur with which other elements. In an embodiment, first feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device 104 may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\mathrm{argmin}_{c_i \ni c} \mathrm{dist}(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between a elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

In continued reference to FIG. 1, in some embodiments, performing an orientation check on a plurality of slides 148 in a pick basket 150 may further include assigning a verification label 160 to each slide position as a function of verifying that the orientation of the first slide aligns with the system requirement, calculating a proportion of verified slides 168 in comparison to the plurality of slides 148 in the pick basket 150, comparing an orientation threshold 164 to the proportion of verified slides 168, and determining an appropriate orientation of the at least a robotic arm 128 as a function of the orientation threshold 164 and the proportion of verified slides 168. As used herein, a "verification label" is a label indicating whether an item been validated or confirmed to meet certain standards or criteria. For example, a verification label 160 may be indicated for a specific slide position within a pick basket 150, wherein the verification label 160 indicates that the slide at a specific position within the pick basket 150 is either in a correct orientation and therefore verified and/or in a flipped orientation and therefore unverified. An "orientation threshold" is a predefined limit or criterion used to determine whether a pick basket 150 as a whole is in a correct orientation. For example, the orientation threshold 164 may be set to a 51% deviation, wherein system 100 is configured to "pre-scan" a set number of slides and if the number of verified slides outnumbers the number of unverified slides the pick basket 150 is labeled as the correct orientation. Such a verification process may be performed iteratively throughout the scanning process. Assigning the verification label 160 as a function of verifying that the orientation of the first slide aligns with a system requirement may mean that each slide orientation identified thereafter may be determined in comparison to the first slide orientation.

Further referencing FIG. 1, at least a processor 108 may calculate a proportion of verified slides 168 in comparison to the plurality of slides 148 in the pick basket 150 by adding up the number of verified slides and dividing by the number of the entirety of the plurality of slides 148 present in the pick basket 150. The output of this calculation may be compared to the orientation threshold 164. If the at least a processor 108 determines that the proportion of verified slides 168 is greater than the orientation threshold 164 the scanning process may begin. Alternatively, if the at least a processor 108 determines that the proportion of verified slides 168 is less than the orientation threshold 164 it may determine an appropriate reorientation of the robotic arm 128 and act on the one or more actuators 132 to mirror the appropriate reorientation of the robotic arm 128, enabling the robotic arm 128 to pick individual slides 152 in the correct orientation. This process ensures that the pick basket 150 is in the correct orientation as a whole, if it is determined that the pick basket 150 has been rotated or flipped then the robotic arm 128 may make the correction prior to beginning the scanning or picking process.

In continued reference to FIG. 1, in an embodiment, performing an orientation check on a plurality of slides 148 in a pick basket 150 may further include detecting at least a visual datum 144, using the visual data sensor 140, of an individual slide 152 of the plurality of slides 148 at a given position, determining, at the at least a processor 108, the orientation of the individual slide 152 at a given position, and orienting, using the one or more actuators 132, the robotic arm 128 as a function of the orientation of the slide at a given position. This process may continue at each position of the pick basket 150 for each individual slide 152 of the plurality of slides 148. Further, this process ensures that each individual slide 152 of the plurality of slides 148 is in the correct orientation regardless of any "pre-scans." Although the robotic arm 128 may have corrected its orientation for the pick basket 150 as a whole, it may reorient itself for any outliers within the otherwise correctly oriented pick basket 150.

In further reference to FIG. 1, at least a processor 108 may be configured to pick, using at least a robotic arm 128, an individual slide 152 of the plurality of slides 148 as a function of verifying that the orientation of the first slide algins with the system requirement. If the orientation of an individual slide 152 is verified, meaning correctly oriented, the at least a robotic arm 128 may pick the individual slide 152 up and move it to the next step in the process. Alternatively, if the individual slide 152 is unverified, meaning the slide is flipped, the at least a processor 108 may command the at least a robotic arm 128 to rotate or reorient itself prior to picking the slide. In some embodiments, the at least a robotic arm 128 may pick the slide and rotate once the slide has been picked. Prior to placing the slide, in some embodiments, system 100 may be configured to reverify a slide's orientation prior to placing the slide for scanning. Picking, using at least a robotic arm 128 may be implemented as disclosed in U.S. patent application Ser. No. 18/796,717, filed on Aug. 7, 2024 and entitled "SYSTEM FOR MICROSCOPY SLIDE LOCKING USING A SWIVEL MECHANISM AND METHOD OF USE THEROF" the entirety of which is incorporated herein by reference.

Continuing to reference FIG. 1, in an embodiment, the at least a processor 108 may be configured to place, using the at least a robotic arm 128, the individual slide 152 at a scanner 124 configured to scan the individual slide 152. In one or more embodiments, scanner 124 may perform an initial orientation and positioning check, wherein if slide position is off, the at least a processor 108 may be configured to reorient the individual slide 152 in order to bring the individual slide's 152 orientation and positioning into compliance. This may occur by interfacing system 100 with external software configured to optimize slide digitization.

Still referring to FIG. 1, in an embodiment, a pick and place method may be utilized by robotic arm 128. Wherein a pick and place method includes configuring at least a processor 108 to receive a calibration procedure, wherein the calibration procedure is generated using a plurality of waypoints, control at least a robotic arm 128 as a function of the calibration procedure, wherein the calibration procedure is configured to cause the robotic arm 128 to pick, using a pick waypoint of the plurality of waypoints, and place, using a place waypoint of the plurality of waypoints, a slide 152, receive a plurality of feedback from the at least a robotic arm 128, generate, using the plurality of feedback, an adapted pick waypoint, and generate, using the plurality of feedback, an adapted place waypoint. A "waypoint" is a reference point in physical space used for purposes of navigation. In a non-limiting example, waypoints may be used in sequence to outline a predetermined course or to mark locations of interest. Further, a "pick waypoint" is a specific type of waypoint that denotes a location where robotic arm 128 or a similar device is intended to perform a pick operation. For example, here pick basket 150 and a location within pick basket 150 may have an assigned pick waypoint. Alternatively, a "place waypoint" is a specific type of waypoint that indicates a location where robotic arm 128 or a similar device is intended to perform a place operation. For example, here the scanner 124 may have an assigned place waypoint. In an embodiment, wherein at least a processor 108 is enabled to return, using robotic arm 128, the first slide 152 to its original position in pick basket 150, scanner may have an assigned pick waypoint and pick basket 150 and a location within pick basket 150 may have a place waypoint assigned to it. In a non-limiting example, the pick and place method may be accomplished using systems and methods as disclosed in U.S. patent application Ser. No. 18/766,242, filed on Jul. 8, 2024 and entitled "APPARATUS AND METHOD FOR ADAPTIVE HANDLING OF SLIDES USING A ROBOTIC ARM" the entirety of which is incorporated herein by reference.

Still referring to FIG. 1, in an embodiment, at least a processor 108 may be configured to return, using the at least a robotic arm 128, the individual slide 152 to its original position in the pick basket 150. Maintaining the positioning of each individual slide 152 within the pick basket 150 may be crucial for organization and identification of individual slides 152 and their related data.

With further reference to FIG. 1, in an embodiment, the at least a processor 108 may be further configured to monitor an error status 172 of one or more scanners 124. In such an embodiment, one or more scanners 124 may be communicatively connected to at least a processor 108. Further the memory 112 may contain instructions 116 configuring at least a processor 108 to monitor an error status 172 of one or more scanners 124, identify an active error status 172 of one or more scanners 124, and reassign a pick basket 150 workload associated with the one or more scanners 124 having the active error status 172 to one or more scanners 124 in an inactive error status 172. In an embodiment, an individual scanner 124 may be designated for a particular pick basket 150, which may be indicated by the location of the pick basket 150 on the cluster table. Each pick basket 150 may have a corresponding workload that is designated to a particular scanner 124 or a group of scanners 124. An "error status," for the purposes of this disclosure, is a datum that indicates whether or not a scanner is able to scan. In some embodiments, error status may include an error code or other identifier that provides information regarding an error or defect of the scanner. A scanner 124 may be in an error status 172 for various reasons, however, it means that its designated workload is not being completed. System 100 is configured to identify when a scanner 124 is in an error status 172 and reassign the workload to a scanner 124 in an inactive error status 172. The monitoring and management of scanner 124 error status 172 may be completed by a monitoring and management module 176. The monitoring and management module 176 may employ a decision tree structure in monitoring and managing the one or more scanner's 124 error statuses 172. For example, if an individual scanner 124 is identified as being in an error status 172, the monitoring and management module 176 may identify one or more scanners 124 in an inactive error status 172 and assign the workload of the scanner 124 in error status 172, to the one or more scanners 124 in an inactive error status 172. In an embodiment, a decision tree structure may include step-by-step questions that lead to the reassignment. For example, the decision tree structure may include inquires such as, are there any scanners 124 in an inactive error status 172, if yes, of those scanners 124 in an inactive error status 172 are there any scanners 124 without an active workload, if yes, assign the present workload to the scanner 124 with an inactive error status 172 and an inactive scanning status 180. Such a process may be beneficial in avoiding hot swapping of scanners 124. In an embodiment, hot swapping of scanners 124 may be implemented, without limitation, as disclosed in U.S. patent application Ser. No. 18/538,959, filed on Dec. 13, 2023 and entitled "APPARATUS AND METHOD OF HOT-SWAPPING A COMPONENT UNIT IN A CLUSTER" the entirety of which is incorporated herein by reference.

With continued reference to FIG. 1, in an embodiment, at least a processor 108 may be further configured to monitor a scanning status 180 of one or more scanners 124, wherein the scanning status 180 includes an active status and an inactive status, and place the individual slide 152 at a scanner 124 having an inactive scanning status 180. A "scanning status," as used herein, is a datum that indicates whether a scanner is actively scanning or not. An "active scanning status" refers to the status of a scanner 124 which is currently undergoing the scanning of an individual slide 152. Alternatively, an "inactive status" refers to the status of a scanner 124 which is not currently undergoing the scanning of an individual slide 152. Such a process may be accomplished using the monitoring and management module 176 as described above. Further, such a process may optimize the scanning of a plurality of slides 148 due to its ability to enable system 100 to ensure a workload is spread across all available scanners 124.

Still referring to FIG. 1, in an embodiment, at least a processor 108 may be further configured to store data for each individual slide 152 based on their position in the pick basket 150 using a catalog data structure 184. A "catalog data structure" is a logical organization of data that facilitates the storage, retrieval, and management of information in a systematic manner. Each individual slide 152 may be placed in a specific position of the pick basket 150, additionally, each slide is placed at a scanner 124, this positional data, as well as associated metadata, may be stored at a catalog data structure 184 for each individual slide 152. This may enable a user to access the catalog data structure 184 for further analysis and/or processing. Further it organizes and identifies each of the individual slides 152 in a pick basket 150 which is crucial in applications wherein the individual slides 152 themselves have no identifiers. Associated metadata may include data outputs of any of the steps in the process of scanning an individual slide 152. Catalog data structure 184 may be located at database 120, which may be remote and/or local to system 100.

In further reference to FIG. 1, in an embodiment, the at least a processor 108 may be configured to output the catalog data structure 184 to a requesting party. In an embodiment, a requesting party may include one or more databases 120. In some cases, a requesting party may include a display device 188. Display device 188 may be configured to display a graphical user interface 192 (GUI). In an embodiment, outputting the catalog data structure 184 may include generating a user interface including the catalog data structure 184, and transmitting catalog data structure 184 to a display device 188, wherein the display device 188 is configured to display a GUI 192.

Continuing to reference FIG. 1, as used in this disclosure, a "display device" refers to an electronic device that visually presents information to the entity. In some cases, display device 188 may be configured to project or show visual content generated by computers, video devices, or other electronic mechanisms. In some cases, display device 188 may include a liquid crystal display (LCD), a cathode ray tube (CRT), a plasma display, a light emitting diode (LED) display, and any combinations thereof. In a non-limiting example, one or more display devices 188 may vary in size, resolution, technology, and functionality. Display device 188 may be able to show any data elements and/or visual elements in various formats such as, textural, graphical, video among others, in either monochrome or color. Display device 188 may include, but is not limited to, a smartphone, tablet, laptop, monitor, tablet, and the like. Display device 188 may include a separate device that includes a transparent screen configured to display computer generated images and/or information. In some cases, display device 188 may be configured to present a GUI 192 to a user, wherein a user may interact with the GUI 192. In some cases, a user may view a GUI 192 through display. Additionally, or alternatively, processor 108 may be connected to display device 188. In some embodiments, GUI 192 may be updated based on user inputs and the integrated neurodegenerative risk score.

A "GUI" is a visual interface that allows users to interact with electronic devices through graphical elements rather than text-based commands. Features of a GUI 192 may include, but are not limited to windows, icons, menus, buttons, sliders and controls, and/or any other graphical content configured to assist a user in interacting with an electronic device. As used in this context, "manipulation" refers to actions or interactions a user may perform to modify, control, or navigate through an interface. Such manipulations may require the use of input devices such as, but not limited to mouses, keyboards, and/or touchscreens. For example, manipulations may include clicking, dragging, scrolling, resizing, zooming, hovering, right-clicking, keyboard shortcuts, inputting data, removing data, and/or modifying data.

In continued reference to FIG. 1, in an embodiment, GUI 192 may include one or more event handlers. As used throughout this disclosure, "event handler" refers to functions or methods designed to respond to specific events in a program, particularly in user interface contexts. An "event" is an occurrence that is detected by the program. For example, this may include a mouse click, keyboard input, and/or a change in a form field. In an embodiment, event handlers may include a listener and or binding process. A listener is a function that listens for specific events on an element. For instance, a button or an input field. A binding process is the process of associating an event with its handler. When an event occurs, an event object may be passed to the handler, containing details about the event. Event handlers allow for interactivity, modularity, and reusability. In such that, event handlers enable applications to respond dynamically to user actions, organize code by separating event handling logic from other program logic, and the same handler may be used for multiple elements and/or events. Further, in an embodiment, the feedback from an event handler may be utilized as training data in the training or retraining of models and/or modules as described here within.

Figure 2A:
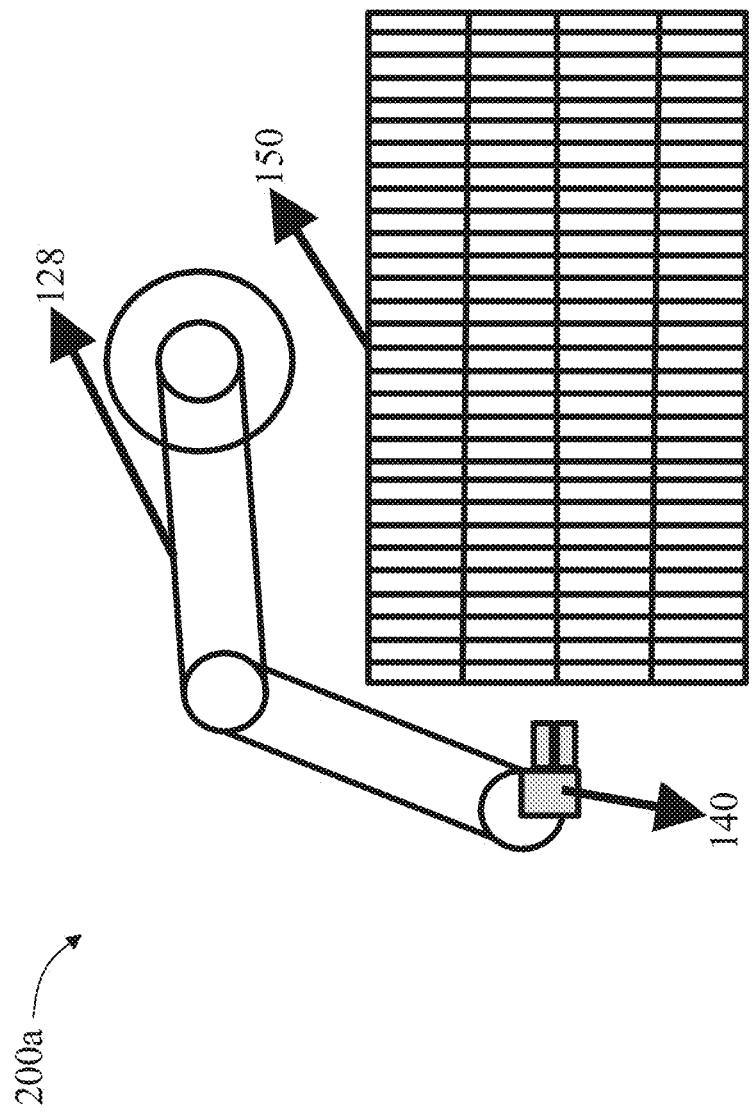

Referring now to FIG. 2A, an exemplary system diagram 200a of flipped slide detection using a visual data sensor 140 on a gripper is shown. FIG. 2A shows the visual data sensor 140 on the gripper capturing data of the slides placed in a pick basket 150. The scanning may be performed to identify the labels on the slide. Once the data for a set of slides are captured, the gripper may hover forward to capture data of the next set of slides, using the visual data sensor 140.

Figure 2B:
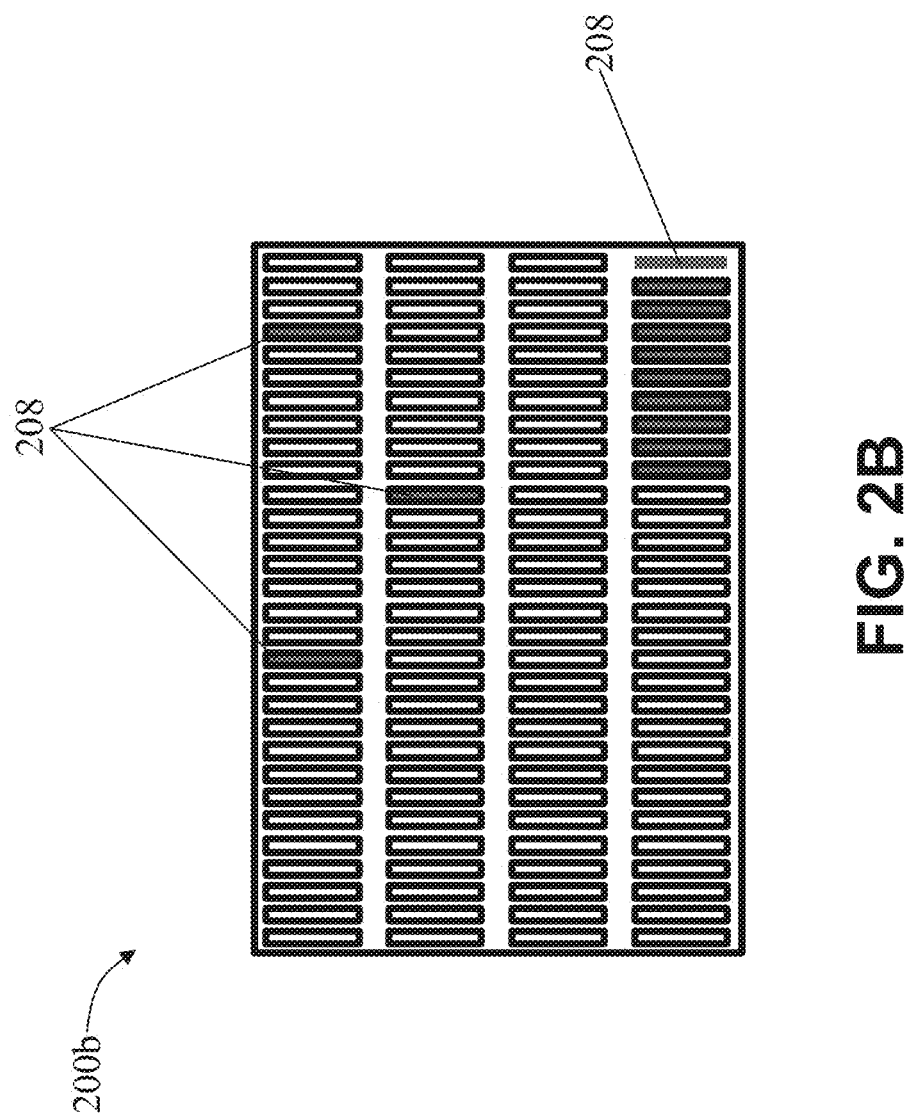

FIG. 2B displays a user interface 200b which may indicate to a user, the slides that are flipped 208. This information may be obtained from the data captured by the visual data sensor and processed by a computer-vision module. This information may notify a user that the slides are flipped 208, enabling them to take appropriate action. In some embodiments, this information may notify the system that the slides are flipped 208, allowing for a determination of a next action. For example, a next action may include adjusting the orientation of the robotic arm in relation to the flipped slides.

Figure 2C:
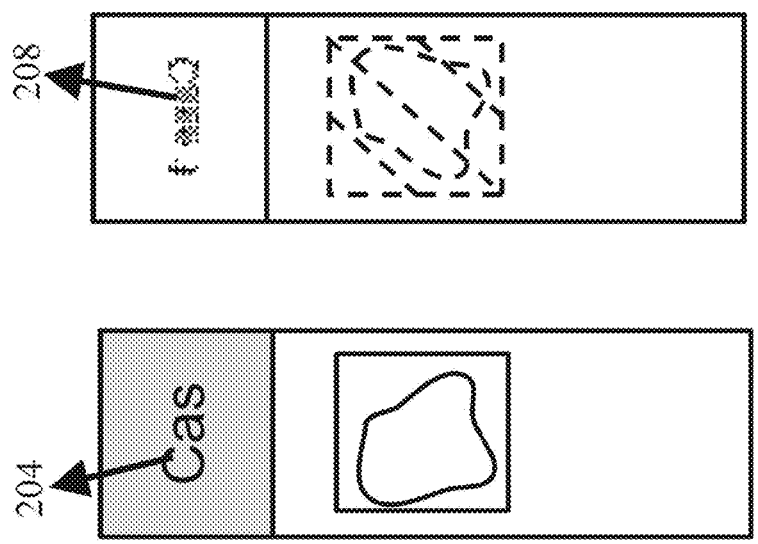

FIG. 2C shows an original side 204 and a flipped side 208 of an individual slide. For example: if the sensor was a camera, then the camera on the gripper may capture images of the slides placed in the pick basket, send the images of the slides to at least a processor, wherein the at least a processor may then identify the orientation of the label to decide if the slide is flipped or not. The image 2C shows an example of the original side 204 and the flipped side 208 of the slide. When the slide is flipped, the label is mirrored which is analyzed by the computer-vision module.

Figure 2D:
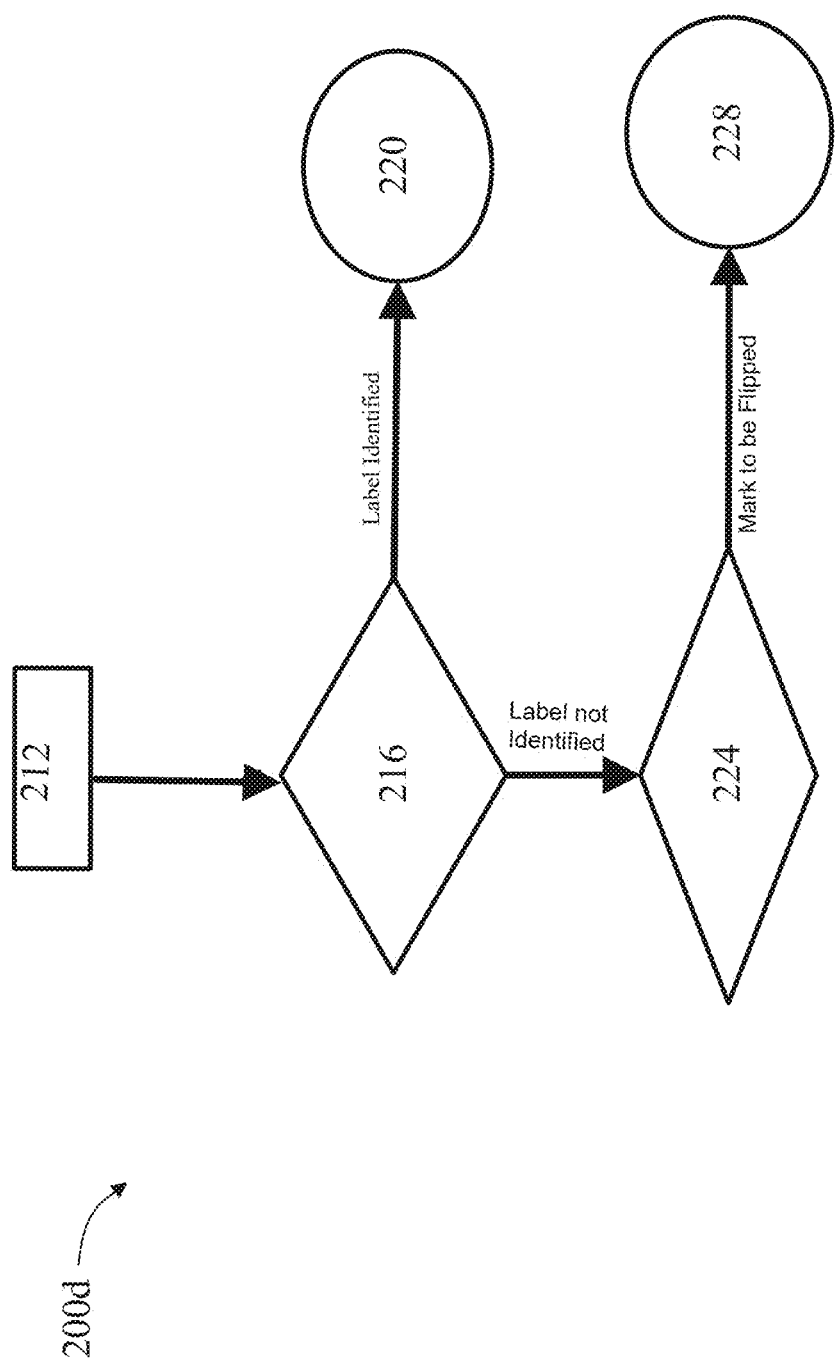

FIG. 2D shows an exemplary decision tree representing a flipped slide detection workflow 200d. In this workflow, once the sensor captures the label data of the slides 212, a computer-vision module may attempt to identify the label information on the slide 216. If the label is successfully identified, the system may determine that the slide is properly oriented and provide feedback indicating that the slide is not flipped 220. If the label is not identified, the module may then evaluate whether the label appears mirrored or whether white banding is present, as white banding can occur when a label sticker is viewed from the reverse side of a flipped slide 224. If either mirroring or white banding is detected, the system may mark the slide as flipped 228, and this status may be indicated to the user via a graphical user interface.

FIG. 2E shows an exemplary robotic arm reorientation 200e to handle flipped slides. In such a case, the visual data sensor located on the gripper may detect visual datum that is then sent to at least a processor, wherein the at least a processor may identify a slide to be flipped, then the computer-vision module may trigger the robotic arm to reorient itself in order to pick the slide in the correct orientation. In instances wherein the pick basket itself is placed in a flipped direction, the computer-vision module may identify all the slides in the flip basket to be flipped. This in turn may trigger the robotic arm to change orientation to pick all the slides in the basket for scanning. This reorientation mechanism of the robotic arm may reduce user intervention in order to flip the slides manually, thereby saving time.

Figure 3A:
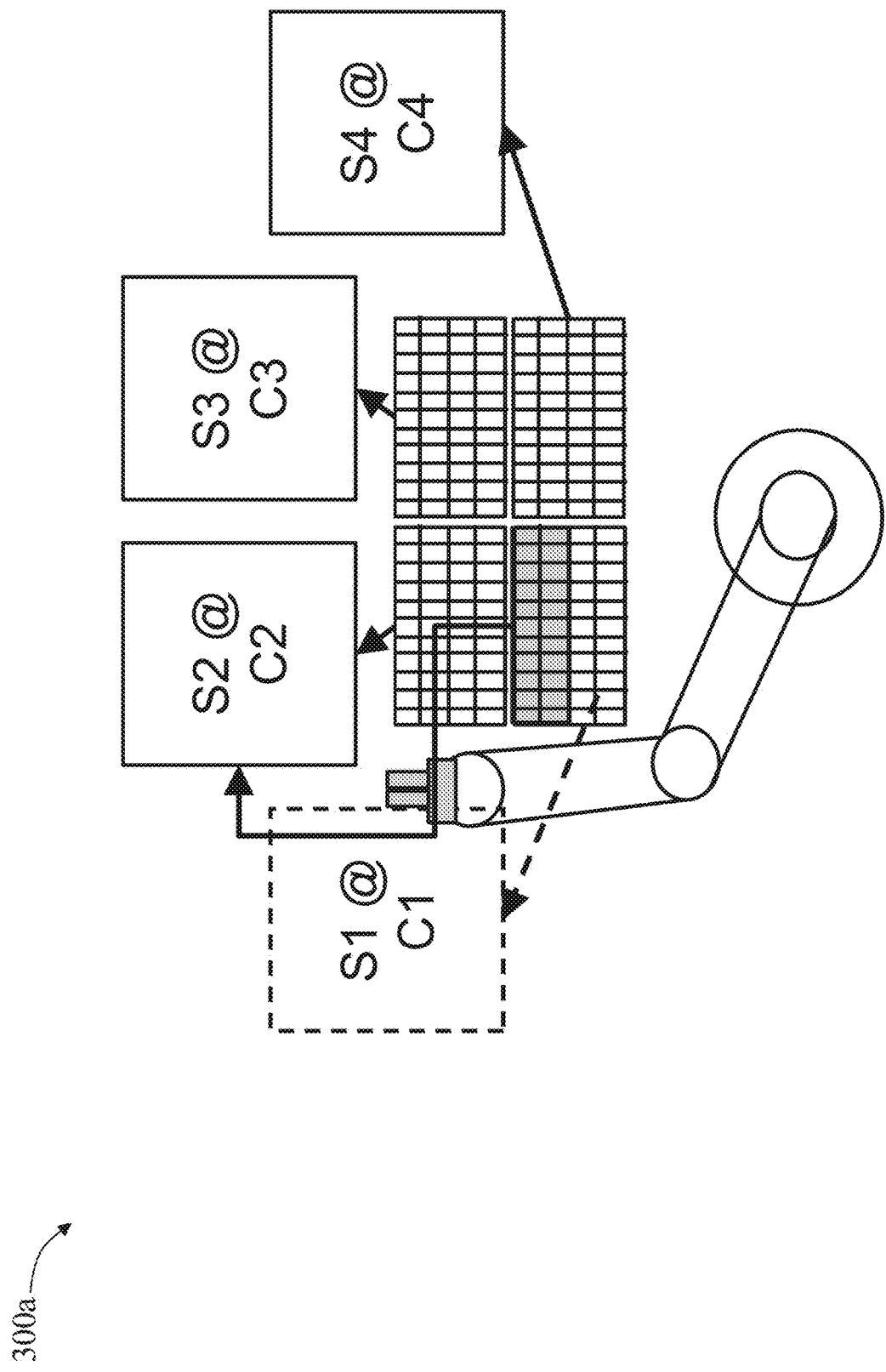
FIGS. 3A-B illustrate exemplary system diagrams of the cluster arrangement for reassignment of basket load to a secondary scanner and no-mapping.

Now referring to FIG. 3A, an exemplary system diagram 300a of the cluster arrangement for reassignment of basket load to a secondary scanner and no-mapping is shown. FIG. 3A shows the cluster arrangement for case 1 scenario. In this method, when any scanner is in an error state, the scanner is kept idle. All the queued slides from the pick basket assigned to the idle scanner, are reassigned to another available scanner to resume scanning of the slides from the position the first scanner had stopped scanning. For example, if the first scanner is in an error state after scanning a set of slides, the remaining slides are queued to another available scanner without hindering the cycle. This may enable the users to scan and access the slide information, irrespective of the scanner status assigned to the particular pick basket, and may save scanning time.

Figure 3B:
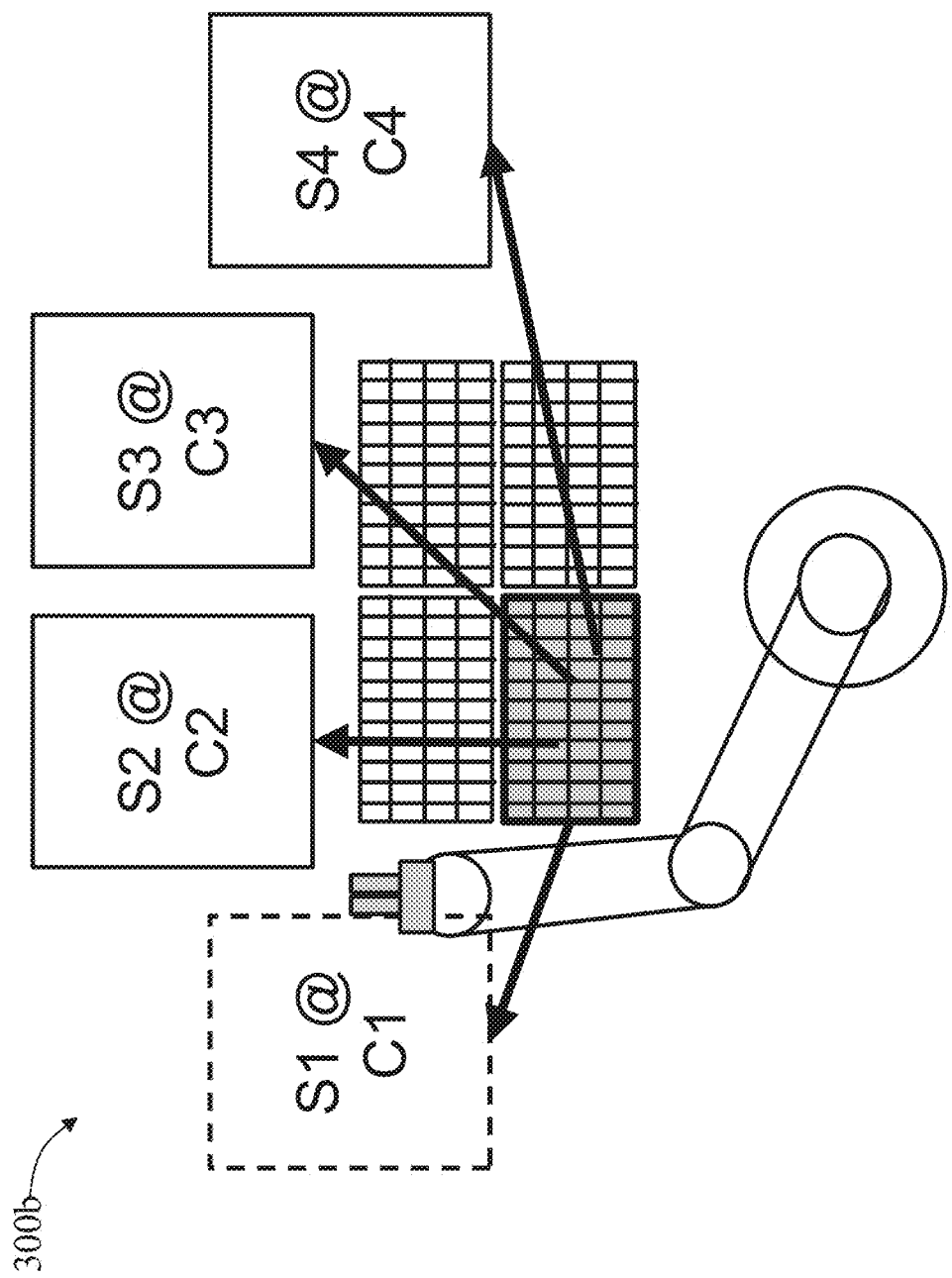

Now referring to FIG. 3B, an exemplary system diagram 300b shows the cluster arrangement for case 2 scenario. In this method, no scanner is assigned to a specific basket. When a basket is loaded, the slides from the basket are delivered to all available scanners. If multiple baskets are loaded, slides are picked up from the first one and the rest are queued. After the first loaded basket is empty, slides may be picked from the next basket in the queue. In case a scanner goes down, all the slides from the basket are assigned to the remaining available scanners. For example, if the first scanner has encountered an error, then the slides from basket one will be scanned by the other available scanners i.e., scanner 2, 3, and 4.

This no mapping method may ensure the user can access the slide information faster than the former method. The operator loads the slides for scanning as soon as they are prepared and he/she does not wait until all the slides in the baskets are loaded. They may begin loading a basket and start the scan as soon as they receive a complete case or two.

In an embodiment, an operator may decide whether the slide has to be placed in a drop basket or back in the pick basket after scanning. If the slides have to be placed in the drop basket, the order in which the slides are placed may not always be retained. To retain the order in which the slides are loaded, they can be placed back into the pick basket once the scanning is completed.

Now referring to FIG. 4A-4D, an exemplary system diagram of an overview of slide traceability is shown. FIG. 4A shows a workflow demonstrating the principle of slide traceability. The steps involved may include picking the slide from a particular slot of the pick basket, placing the slide on the respective scanner for scanning the slide, capturing the slide information and storing the captured data and placing back the slide in the same slot that it was picked from.

FIG. 4B shows an exemplary pick basket nomenclature. The rows of the pick basket may be denoted by alphabetical letters (for eg: A, B, C, D, etc based on the number of rows in the pick basket) and the columns of the pick basket may be denoted by numbers (for eg: 1, 2, 3, etc. based on the number of columns in the pick basket). Shown is an example of a pick basket with 4 rows, 30 columns and 120 slots. This nomenclature may make the slide traceability easier for a user to trace the slide based on the location coordinates (For example: slide P134 is in the coordinates, C18 means that the slide with unique identifier, P134 is present in the 3rd row and 18th column of the pick basket).

FIG. 4C shows an exemplary handling of slide placement failures. When the robotic arm is trying to place the slide back into the respective slot after scanning, there are two possibilities that it may encounter. One possibility is that it can place the slide back correctly into the slot. The second possibility is that the slide can hit the wall of the slot, which may trigger a force-torque sensor. The force-torque sensor reading aids the at least a processor in correction of the slide placement and the slide is placed successfully into the respective slot based on the adjustments made to the robotic arm according to the reading. Slide traceability may enable a pathologist to keep a track of the slides and access a particular slide with ease. In an embodiment, a user interface may include a lookup table which may help to trace back the slide position and access the slide information easily.

FIG. 4D shows an exemplary process of slide traceability when the label identifiers are not unique or when the label is not found. For example, in a case where the label is not unique, then a set of slides may have the same label identifiers. In this case, identification and slide traceability may become difficult in other systems. However, when these slides are placed in different slots of the pick basket, each slide has a unique coordinate. This makes the slide traceability easier. In cases wherein the slide does not contain a label, the location coordinates of the pick basket can be used to trace back the slides. In both situations, the slides may be scanned and the whole slide image is captured and stored with reference to the pick basket coordinates.

Figure 5:
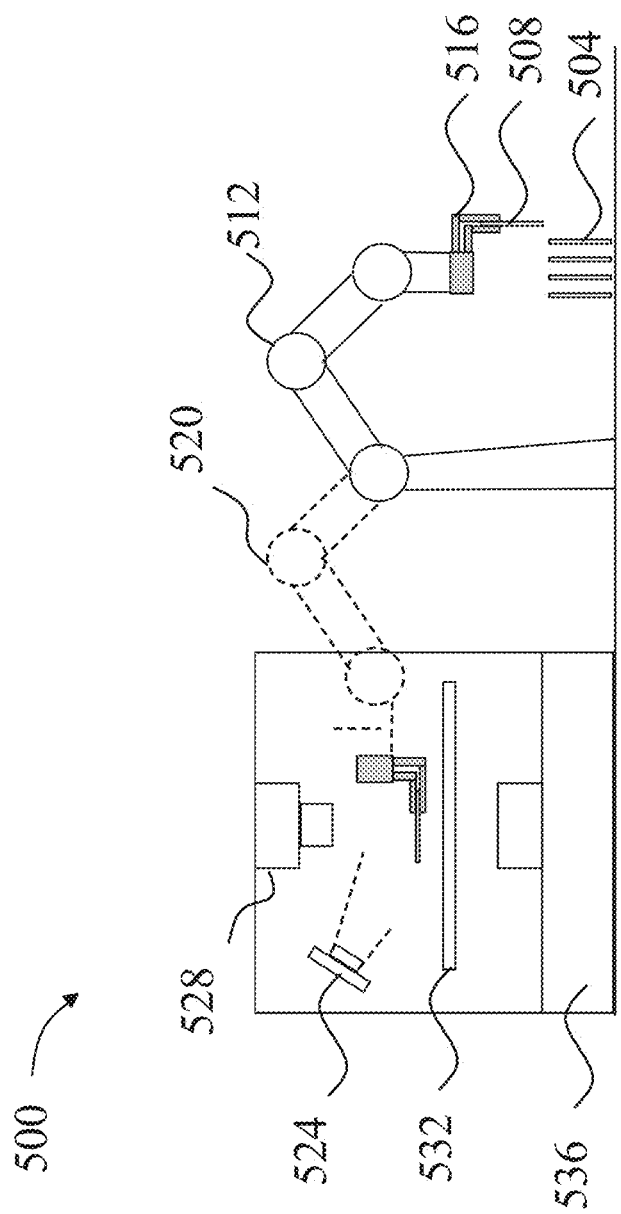
FIG. 5 is an illustration of an exemplary embodiment of the slide handling operations using a robotic arm.

Referring now to FIG. 5, an exemplary embodiment of the slide handling operations using a robotic arm, 500, is illustrated. In an embodiment, the slide basket 504 is designed to securely hold multiple slides 508. In an embodiment, slides 508 are picked up by robotic arm 512 in its first pose, utilizing effector 516 specifically engineered for precise and gentle handling. In an embodiment, effector 516 ensures that slides 508 are gripped securely without causing any damage. In an embodiment, robotic arm 512 transitions to second pose 520. In an embodiment, robotic arm 512 adjusts its position and orientation to align slides 508 with macro imaging analysis 524 system. In an embodiment, the alignment may be critical for ensuring that slides 508 are accurately placed for subsequent analysis.

Without continued reference to FIG. 5, during the transition and positioning process, optical device 528 may provide real-time feedback to the robotic arm. In an embodiment, the feedback may provide information to help monitor the precise handling of each slide 508 as they are moved to various positions on the XY stage 532. In an embodiment, optical device 528 may ensure that robotic arm 512 adjusts its movements accurately, maintaining the correct alignment and orientation of the slides. In an embodiment, this level of precision is necessary to avoid any potential errors or misplacements that could affect the quality of the imaging analysis. In an embodiment, the feedback system allows for continuous monitoring and adjustment, enhancing the overall reliability of the operation.

Without continued reference to FIG. 5, the setup is supported by a robust scanner 536, which may provide stability and precision during the Z Plane adaptation process. In an embodiment, the slide handling operations may involve fine adjustments in the vertical positioning of the slides to ensure that they are at the optimal focal point for imaging. In an embodiment, the scanner's stability may ensure that there are no vibrations or shifts that could disrupt the imaging process. In a non-limiting example, integrating robotic arm 512, effector 516, optical device 528, and scanner 536, may enable the system to achieve high levels of accuracy and efficiency in handling and analyzing slides. In an embodiment, the integrated approach may improve the reliability of the imaging results and enhance the overall workflow, making it more efficient and less prone to errors.

Figure 6:
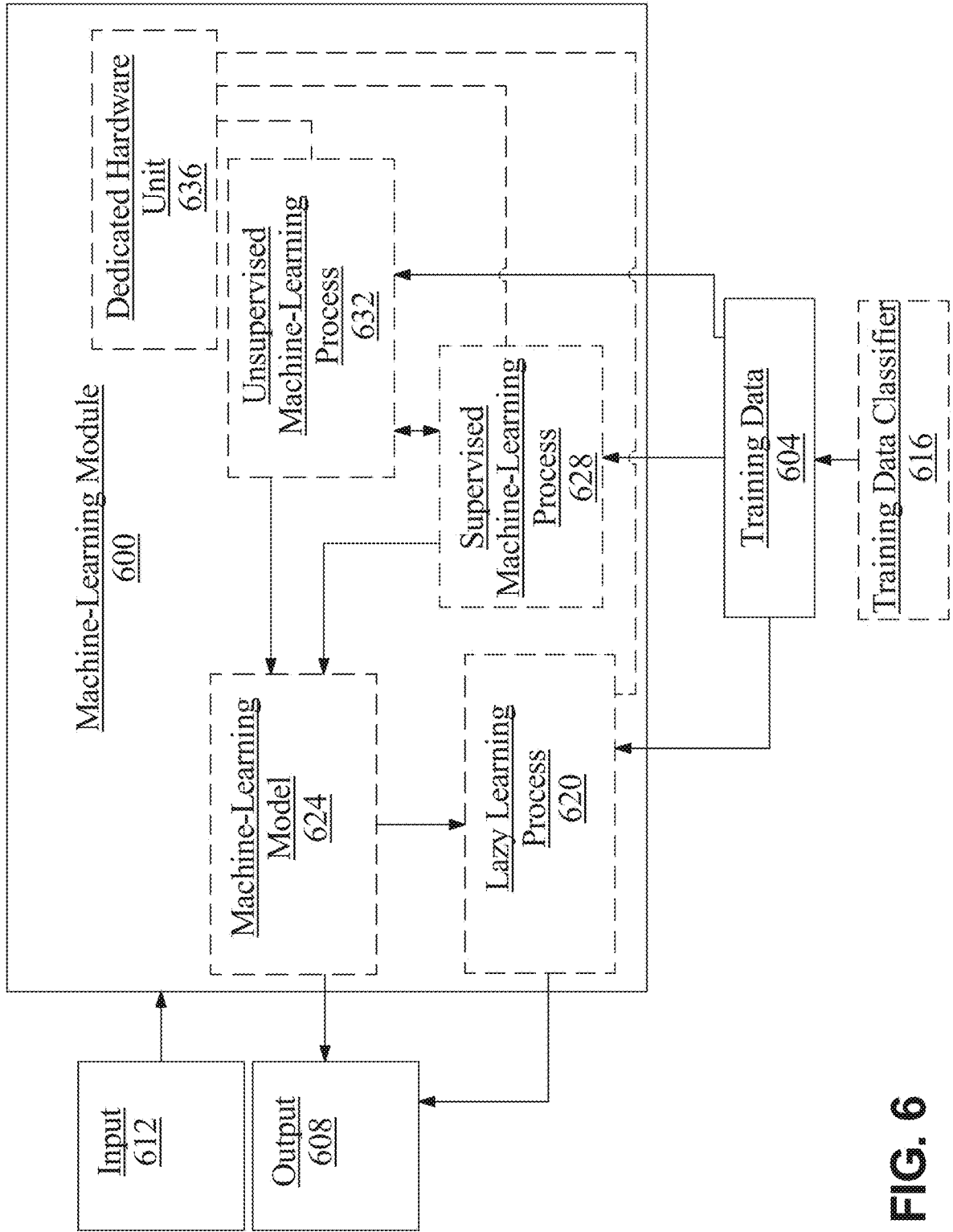
FIG. 6 is a block diagram of an exemplary machine-learning process.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm instantiated in hardware or software logic, data structures, and/or functions that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example inputs may include visual data from the visual data sensor and outputs may include an orientation determination.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to characterize visual data as verified or unverified, wherein a verified classification indicates the individual slide is in the correct orientation and not flipped.

Still referring to FIG. 6, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 6, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 6, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 6, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 6, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 6, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 6, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 6, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 6, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 6, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include [input examples] as described above as inputs, [output examples] as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With further reference to FIG. 6, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 6, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 632 may not require a response variable; unsupervised processes 632 may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 6, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 6, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 6, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 6, one or more processes or algorithms described above may be performed by at least a dedicated hardware unit 636. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 636 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 636 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 636 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 7:
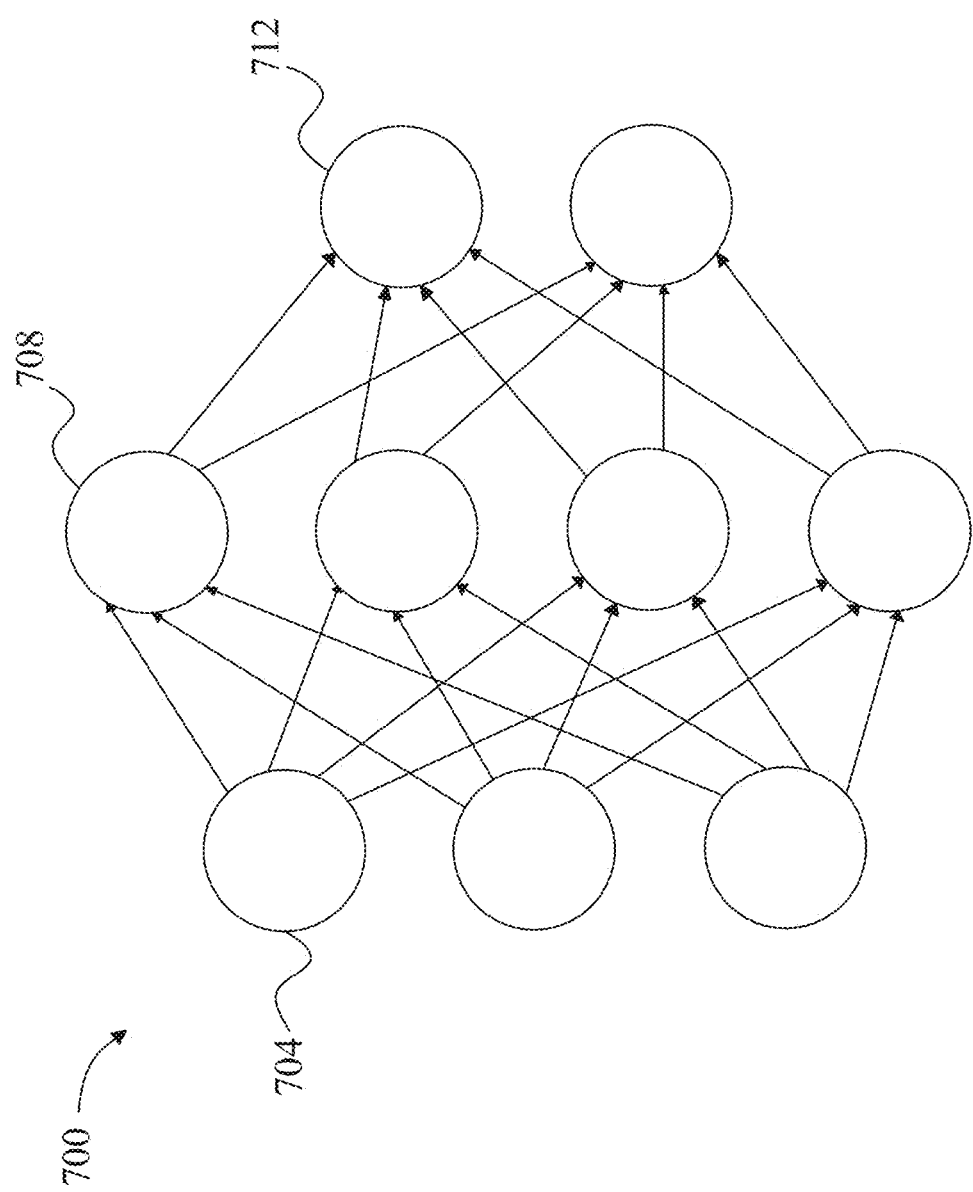
FIG. 7 is a diagram of an exemplary embodiment of a neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
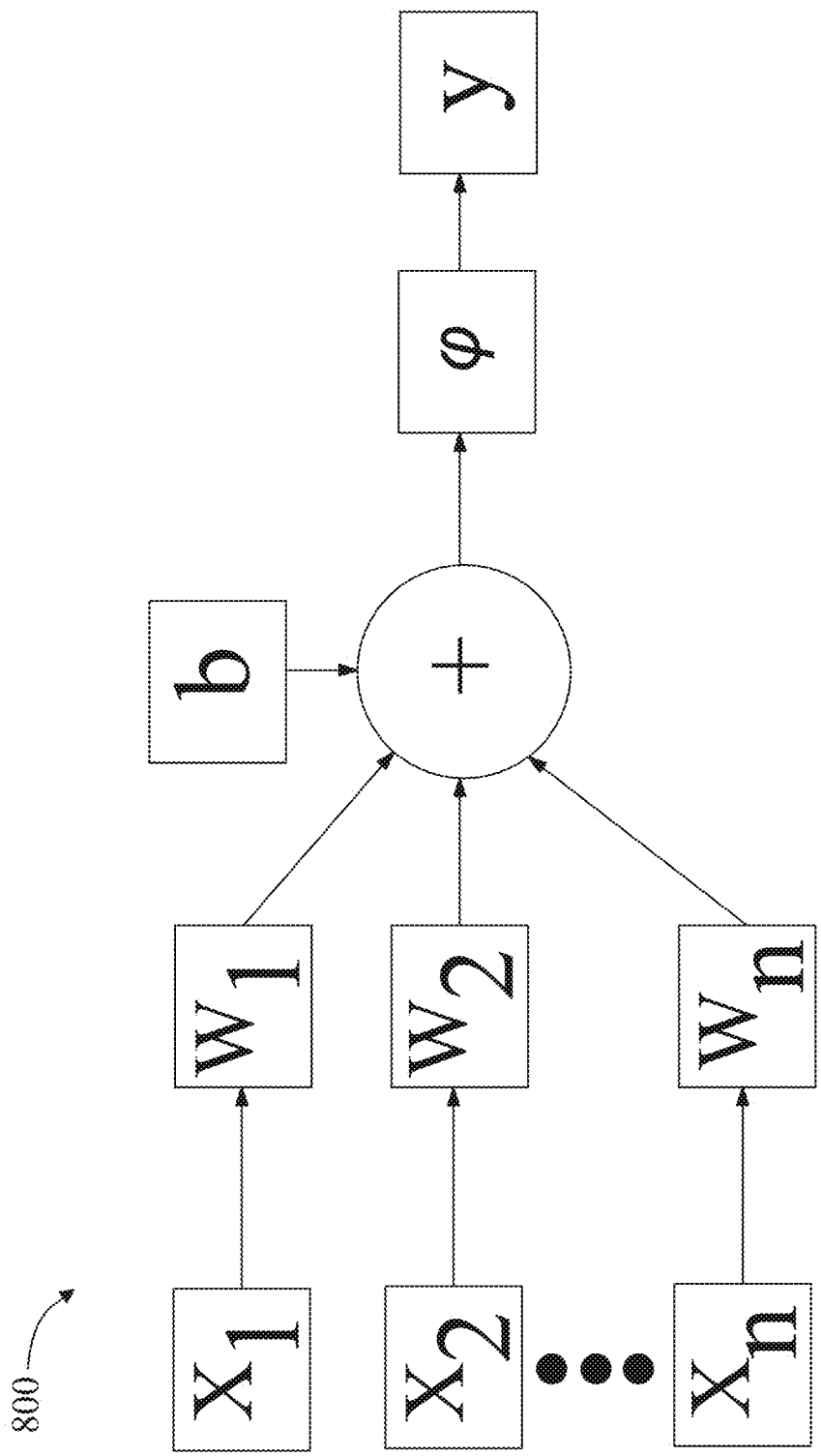
FIG. 8 is a diagram of an exemplary embodiment of a node of a neural network.

Referring now to FIG. 8, an exemplary embodiment of a node 800 of a neural network is illustrated. A node may include, without limitation a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max(0, x), a "leaky" and/or "parametric" rectified linear unit function such as ƒ(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as function such as ƒ(x)=x*sigmoid(x), a Gaussian error linear unit function such as f(x)=a(1+tanh($\sqrt{2/\pi}$(x+bx^r))) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 9:
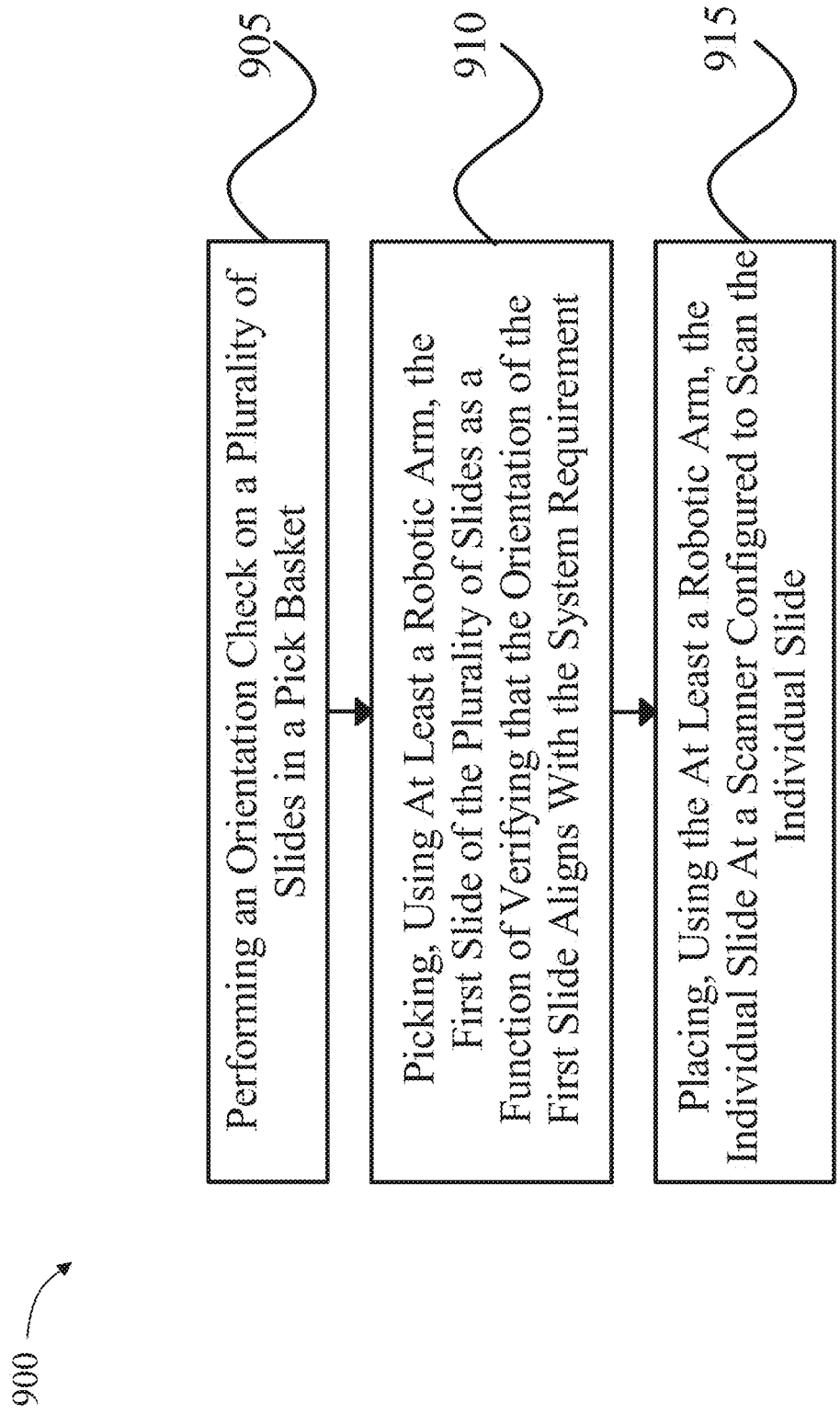
FIG. 9 is a flow diagram illustrating an exemplary method for optimizing slide pick basket operations.

Now referring to FIG. 9, an exemplary method 900 for optimizing slide pick basket operations is illustrated. Method 900 for optimizing slide pick basket operations may include a step 905 of performing an orientation check on a plurality of slides in a pick basket. Step 905 may include receiving visual data from a visual data sensor, identifying, using at least a processor, an orientation of a first slide of the plurality of slides as a function of the visual data, and verifying, using the at least a processor, that the orientation of the first slide aligns with a system requirement. In an embodiment, the visual data sensor may be configured to detect at least a visual datum, the at least a processor may be configured to receive the at least a visual datum, and the at least a processor may be configured to determine the orientation of the first slide using a computer-vision module. Further, in some embodiments, an individual slide of the plurality of slides may include a barcode, wherein the visual data sensor is configured to scan the barcode for at least a visual datum, the at least a processor is configure to receive the at least a visual datum for the visual data sensor, and the at least a processor is configured to determine the orientation of the individual slide as a function of the at least a visual datum. This may be implemented, without limitation, as described in reference to FIGS. 1-8. Method 900 for optimizing slide pick basket operations may include a step 910 of picking, using the at least a robotic arm, the first slide of the plurality of slides as a function of verifying that the orientation of the first slide aligns with the system requirement. This may be implemented, without limitation, as described in reference to FIGS. 1-8. Method 900 for optimizing slide pick basket operations may include a step 915 of placing, using the at least a robotic arm, the first slide at a scanner configured to scan the individual slide. This may be implemented, without limitation, as described in reference to FIG. 1-8.

Further referencing FIG. 9, method 900 for optimizing slide pick basket operations may include a step 9 of returning, using the at least a robotic arm, the first slide to its original position in the pick basket. This may be implemented, without limitation, as described in reference to FIGS. 1-8.

In continued reference to FIG. 9, in an embodiment method 900 may include steps of monitoring an error status of one or more scanners, identifying an active error status of one or more scanners, and reassigning a pick basket workload associated with the one or more scanners having the active error status to one or more scanners in an inactive error status. This may be implemented, without limitation, as described in reference to FIGS. 1-8.

Still referring to FIG. 9, in an embodiment, method 900 may include steps of monitoring a scanning status of one or more scanners, wherein the scanning status includes an active status and an inactive status, identifying a scanner having an inactive scanning status, and placing the first slide at a scanner having an inactive scanning status. This may be implemented, without limitation, as described in reference to FIGS. 1-8.

With further reference to FIG. 9, in an embodiment, method 900 may include a step of storing data for each individual slide based on their position in the pick basket using a catalog data structure. This may be implemented, without limitation, as described in reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
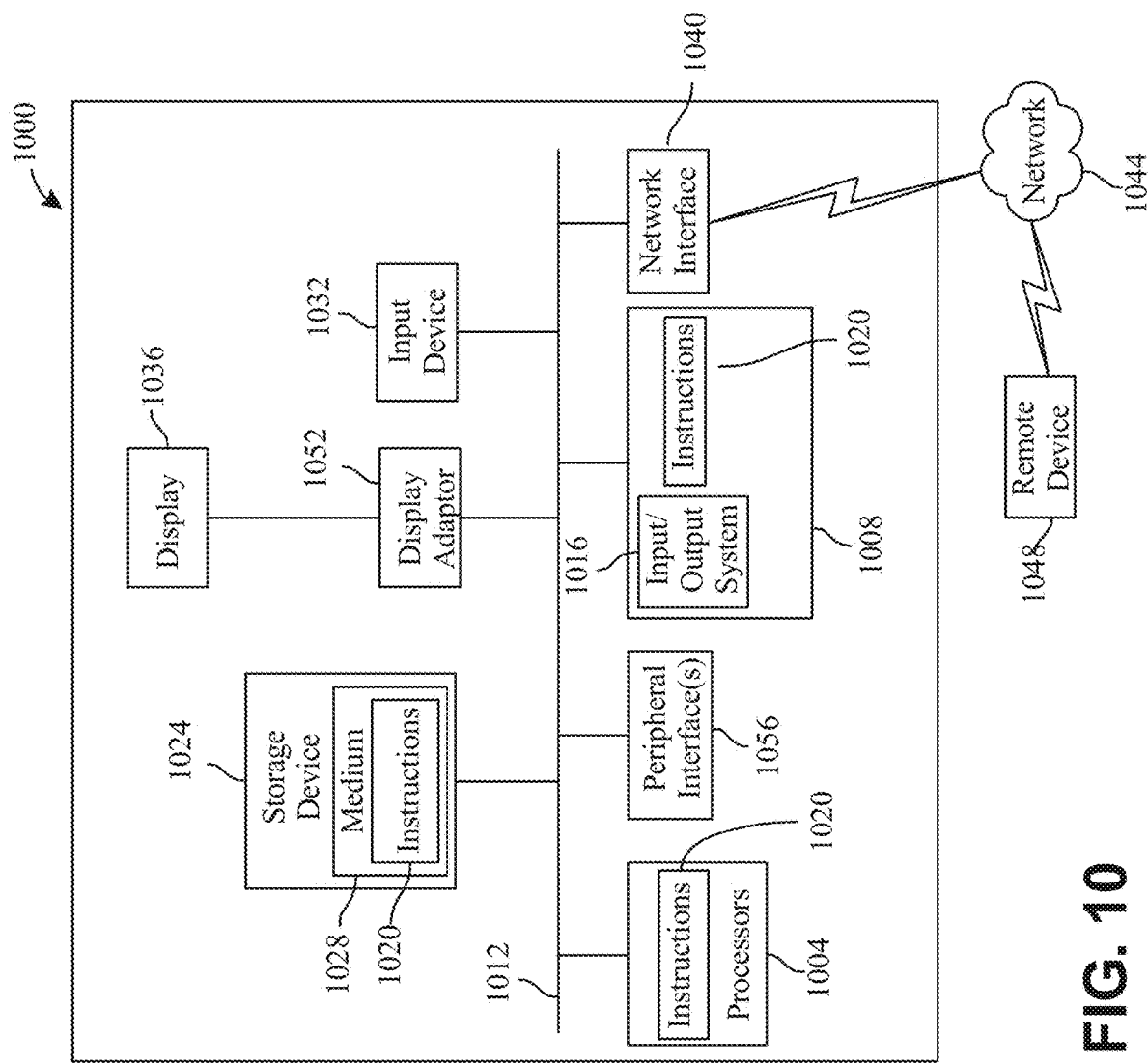
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for optimizing slide pick basket operations, wherein the system comprises:
    at least a robotic arm comprising:
        one or more actuators operatively connected to a plurality of arm segments, wherein the one or more of actuators is configured to move the plurality of arm segments with respect to one another; and
        a visual data sensor;
    at least a processor; and
    a non-transitory memory communicatively connected to the at least a processor, wherein the non-transitory memory contains instructions configuring the at least a processor to:
        perform an orientation check on a plurality of slides in a pick basket, wherein performing an orientation check on a plurality of slides in a pick basket comprises:
            receiving visual data from the visual data sensor;
            identifying an orientation of a first slide of the plurality of slides as a function of the visual data; and
            verifying that the orientation of the first slide aligns with a system requirement;
        select, using the at least a robotic arm, the first slide of the plurality of slides as a function of verifying that the orientation of the first slide aligns with the system requirement; and
        place, using the at least a robotic arm, the first slide at a scanner configured to scan the first slide.

2. The system of claim 1, wherein the at least a processor is further configured to return, using the at least a robotic arm, the first slide to its original position.

3. The system of claim 1, wherein the at least a processor is further configured to:
    monitor an error status of one or more scanners;
    identify an active error status of one or more scanners; and
    reassign a pick basket workload associated with the one or more scanners having the active error status to one or more scanners in an inactive error status.

4. The system of claim 1, wherein the at least a processor is further configured to:
    monitor a scanning status of one or more scanners, wherein the scanning status comprises an active status and an inactive status;
    identify a scanner having an inactive scanning status; and
    place the first slide at the scanner having the inactive scanning status.

5. The system of claim 1, wherein the at least a processor is further configured to store data for each individual slide based on their position in the pick basket using a catalog data structure.

6. The system of claim 1, wherein performing an orientation check on a plurality of slides in a pick basket further comprises:
    assigning a verification label to each slide position as a function of verifying that the orientation of the first slide aligns with the system requirement;
    calculating a proportion of verified slides in comparison to the plurality of slides in the pick basket;
    comparing an orientation threshold to the proportion of verified slides; and
    determining an appropriate orientation of the at least a robotic arm as a function of the orientation threshold and the proportion of verified slides.

7. The system of claim 1, wherein performing an orientation check on a plurality of slides in a pick basket further comprises:

detecting at least a visual datum, using the visual data sensor, of an individual slide of the plurality of slides at a given position;

determining, at the at least a processor, the orientation of the individual slide at a given position; and orienting, using the one or more actuators, the robotic arm as a function of the orientation of the slide at a given position.

8. The system of claim 1, wherein the robotic arm further comprises a gripper, wherein the gripper comprises the visual data sensor.

9. The system of claim 1, wherein:

the visual data sensor is configured to detect at least a visual datum;

the at least a processor is configured to receive the at least a visual datum; and the at least a processor is configured to determine the orientation of the first slide using a computer-vision module.

10. The system of claim 1, wherein the first slide of the plurality of slides comprises a barcode, wherein:

the visual data sensor is configured to scan the barcode for at least a visual datum;

the at least a processor is configured to receive the at least a visual datum from the visual data sensor; and the at least a processor is configured to determine the orientation of the first slide as a function of the at least a visual datum.

11. A method for optimizing slide pick basket operations, wherein the method comprises:

performing an orientation check on a plurality of slides in a pick basket, wherein performing an orientation check on a plurality of slides in a pick basket comprises:

receiving visual data from a visual data sensor;

identifying, using at least a processor, an orientation of a first slide of the plurality of slides as a function of the visual data; and verifying, using the at least a processor, that the orientation of the first slide aligns with a system requirement;

selecting, using at least a robotic arm, the first slide of the plurality of slides as a function of verifying that the orientation of the first slide aligns with the system requirement; and placing, using the at least a robotic arm, the first slide at a scanner configured to scan the first slide.

12. The method of claim 11, further comprising returning, using the at least a robotic arm, the first slide to its original position.

13. The method of claim 11, further comprising:

monitoring an error status of one or more scanners;

identifying an active error status of one or more scanners; and reassigning a pick basket workload associated with the one or more scanners having the active error status to one or more scanners in an inactive error status.

14. The method of claim 11, further comprising:

monitoring a scanning status of one or more scanners, wherein the scanning status comprises an active status and an inactive status;

identifying a scanner having an inactive scanning status; and placing the first slide at the scanner having the inactive scanning status.

15. The method of claim 11, further comprising storing data for each individual slide based on their position in the pick basket using a catalog data structure.

16. The method of claim 11, wherein performing an orientation check on a plurality of slides in a pick basket further comprises:

assigning a verification label to each slide position as a function of verifying that the orientation of the first slide aligns with the system requirement;

calculating a proportion of verified slides in comparison to the plurality of slides in the pick basket;

comparing an orientation threshold to the proportion of verified slides; and determining an appropriate orientation of the at least a robotic arm as a function of the orientation threshold and the proportion of verified slides.

17. The method of claim 11, wherein performing an orientation check on a plurality of slides in a pick basket further comprises:

detecting at least a visual datum, using the visual data sensor, of an individual slide of the plurality of slides at a given position;

determining, at the at least a processor, the orientation of the individual slide at a given position; and orienting, using one or more actuators, the robotic arm as a function of the orientation of the slide at a given position.

18. The method of claim 11, wherein the robotic arm further comprises a gripper, wherein the gripper comprises the visual data sensor.

19. The method of claim 11, wherein:

the visual data sensor is configured to detect at least a visual datum;

the at least a processor is configured to receive the at least a visual datum; and the at least a processor is configured to determine the orientation of the first slide using a computer-vision module.

20. The method of claim 11, wherein the first slide of the plurality of slides comprises a barcode, wherein:

the visual data sensor is configured to scan the barcode for at least a visual datum;

at least a processor is configured to receive the at least a visual datum from the visual data sensor; and the at least a processor is configured to determine the orientation of the first slide as a function of the at least a visual datum.

* * * * *